US012159506B2

(12) United States Patent
Ito et al.

(10) Patent No.: US 12,159,506 B2
(45) **Date of Patent: *Dec. 3, 2024**

(54) ELECTRONIC GAMING SYSTEMS AND INTEGRATION WITH THIRD-PARTY PROVIDERS OF PROPOSITION PLAYER SERVICES

(71) Applicant: Generation Z, LLC, Columbus, MN (US)

(72) Inventors: Taro Ito, Columbus, MN (US); Stephen Deckoff, Columbus, MN (US)

(73) Assignee: Generation Z, LLC, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/130,002

(22) Filed: Apr. 3, 2023

(65) Prior Publication Data

US 2023/0351862 A1 Nov. 2, 2023

Related U.S. Application Data

(63) Continuation of application No. 17/144,778, filed on Jan. 8, 2021, now Pat. No. 11,651,659, which is a (Continued)

(51) Int. Cl.

*G07F 17/32* (2006.01)
*A63F 1/00* (2006.01)
*G06Q 50/34* (2012.01)

(52) U.S. Cl.

CPC ............ *G07F 17/3223* (2013.01); *A63F 1/00* (2013.01); *G06Q 50/34* (2013.01); (Continued)

(58) Field of Classification Search

None

See application file for complete search history.

(56) References Cited

U.S. PATENT DOCUMENTS 5,200,890 A 4/1993 Pionchon
5,489,101 A 2/1996 Moody
(Continued)

FOREIGN PATENT DOCUMENTS

WO WO 2008/091809 7/2008

OTHER PUBLICATIONS www.linkedin.com' [online]. "Multi-hand MultiDraw Poker," Jul. 10, 2017 [retrieved on Jul. 25, 2017]. Retrieved from the Internet: URL <www.linkedin.com/pulse/multi-hand-multidraw-poker-timothy-nottke>. 10 pages.

(Continued)

*Primary Examiner* — Jason T Yen

(74) *Attorney, Agent, or Firm* — Barnes & Thornburg LLP

(57) ABSTRACT

In one implementation, an electronic gaming system can include one or more physical gaming pieces that are used to determine gaming outcomes; a scanner to identify the one or more physical gaming pieces; a plurality of player computing equipment to provide gaming interfaces with electronic gaming action for a corresponding player based, at least in part, on the identified one or more physical gaming pieces, and a gaming computer system connected to (i) the scanner, (ii) the plurality of player computing equipment, (iii) player accounts, and (iv) third-party providers of proposition player (TPPP) accounts. The gaming computer system can identify a TPPP that is assigned to cover gaming action on the game and players who are playing the game; determine gaming outcomes for each of the players; and reconcile player accounts and the TPPP account based on the determined gaming outcomes for each of the players.

20 Claims, 21 Drawing Sheets

Related U.S. Application Data continuation of application No. 16/199,087, filed on Nov. 23, 2018, now Pat. No. 10,930,120.

(60) Provisional application No. 62/590,203, filed on Nov. 22, 2017.

(52) U.S. Cl.
CPC ...... *G07F 17/3209* (2013.01); *G07F 17/3211* (2013.01); *G07F 17/3218* (2013.01); *G07F 17/3227* (2013.01); *G07F 17/3267* (2013.01); *G07F 17/3288* (2013.01); *G07F 17/3293* (2013.01)

(56) References Cited

U.S. PATENT DOCUMENTS

| | | | | |
|---|---|---|---|---|
| 6,132,311 | A | 10/2000 | Williams | |
| 6,508,709 | B1 | 1/2003 | Karmarkar | |
| 6,511,068 | B1 | 1/2003 | Sklansky et al. | |
| 8,113,934 | B2 | 2/2012 | Moody | |
| 8,152,641 | B2 | 4/2012 | Hill | |
| 8,192,267 | B2 | 6/2012 | Acres | |
| 8,287,380 | B2 | 10/2012 | Nguyen et al. | |
| 8,414,403 | B2 | 4/2013 | Denham | |
| 8,425,298 | B2 | 4/2013 | Moody | |
| 8,708,809 | B2 | 4/2014 | Sanford | |
| 10,235,844 | B1 * | 3/2019 | Barksdale | G07F 17/3211 |
| 10,930,120 | B1 | 2/2021 | Ito et al. | |
| 2002/0068635 | A1 | 6/2002 | Hill | |
| 2003/0162424 | A1 | 8/2003 | Berman | |
| 2003/0236113 | A1 | 12/2003 | Webb | |
| 2005/0020338 | A1 | 1/2005 | Stein | |
| 2007/0145684 | A1 | 6/2007 | Webb et al. | |
| 2008/0015030 | A1 | 1/2008 | Baazov | |
| 2008/0207294 | A1 | 8/2008 | Sklansky et al. | |
| 2009/0111573 | A1 | 4/2009 | Iddings | |
| 2009/0264190 | A1 * | 10/2009 | Davis | G07F 17/32 463/41 |
| 2009/0264203 | A1 * | 10/2009 | Warkentin | G07F 17/3223 463/43 |
| 2010/0004051 | A1 * | 1/2010 | Walker | G07F 17/3211 463/22 |
| 2010/0117299 | A1 * | 5/2010 | Nicely | A63F 1/00 273/287 |
| 2010/0222132 | A1 | 9/2010 | Sanford | |
| 2011/0195766 | A1 | 8/2011 | Toompere | |
| 2013/0084962 | A1 | 4/2013 | Radisich | |
| 2013/0196777 | A1 | 8/2013 | Hill | |
| 2014/0357338 | A1 * | 12/2014 | Pockaj | G07F 17/3288 463/16 |
| 2015/0065227 | A1 * | 3/2015 | Naylor | G07F 17/32 463/25 |
| 2016/0012663 | A1 * | 1/2016 | Chun | A63F 9/24 463/16 |
| 2016/0071366 | A1 | 3/2016 | Lind et al. | |
| 2016/0078709 | A1 * | 3/2016 | Stanford | G07F 17/322 463/37 |
| 2018/0089958 | A1 | 3/2018 | Gordon | |

OTHER PUBLICATIONS

Dionne et al., "Large volume flow rate acoustiophoretic phase separator for oil water emulsion splitting." Proceedings of Meetings on Acoustics, vol. 19 (Jun. 2, 2013), pp. 1-8. (Year: 2013).

Lipkens et al., "Separation of bacterial spores from flowing water in macro-scale cavities by ultrasonic standing waves," arXiv upload (Jun. 2010), 1-11. (Year: 2010).

* cited by examiner

ELECTRONIC GAMING SYSTEMS AND INTEGRATION WITH THIRD-PARTY PROVIDERS OF PROPOSITION PLAYER SERVICES

CROSS-REFERENCE TO RELATED APPLICATIONS

This application is a continuation of U.S. patent application Ser. No. 17/144,778 filed Jan. 8, 2021, which is a continuation of U.S. patent application Ser. No. 16/199,087 filed Nov. 23, 2018, which claims the benefit of priority to U.S. Provisional Application Ser. No. 62/590,203, filed on Nov. 22, 2017, and entitled ELECTRONIC GAMING SYSTEMS WITH THIRD PARTY PRIMARY PROVIDERS, the entire contents of which are hereby incorporated by reference.

TECHNICAL FIELD

This document generally describes technology related to electronic gaming systems that integrate with Third-Party Providers of Proposition Player (TPPP).

BACKGROUND

Some gaming regulating bodies require separation between the entity providing a gambling establishment, such as a casino or card club, and the entity serving as the "house" for gaming action (entity covering bets and wagers). In some jurisdictions, like California, the entity covering the gaming action is required to a "player," which includes TPPPs. A TPPP is an entity that provides services in and to a gambling establishment under an agreement with the gambling establishment. Such services can include, for example, play as a participant in controlled games, such as those with rotating player-dealer positions that permit players to cover gaming action for one or more hands or rounds. As presently configured, many gaming establishments have a TPPP representative (from the contracted TPPP) positioned at each gaming table who is responsible for covering the action that takes place each round or hand.

SUMMARY

This document generally describes technology for integrating TPPPs with electronic gaming systems within gaming establishments to provide gaming services. TPPPs can be incorporated into any of a variety of electronic gaming systems, such as gaming provided via dealer-assist gaming systems that automatically detect physically actions (e.g., physically dealt cards, physically rolled dice) and use those physical actions to provide gaming action to players on electronic devices. TPPPs can be integrated into such electronic gaming systems in a variety of ways, such as through electronically linking an assigned TPPP's account to an electronic gaming table to cover gaming action (e.g., debiting and crediting gaming action on that table from the assigned TPPP's account), incorporating ticket-in-ticket-out (TITO) capabilities with TPPP-covered gaming, providing TPPP profiles that define dealer/house gaming strategies in digital files that are used to determine gaming outcomes on assigned games, allowing multiple different TPPPs across a particular gaming establishment (e.g., different TPPPs at different times, different TPPPs at the same time, different TPPPs on different games), permitting players at a table to periodically become the TPPP, and/or other features.

In one implementation, an electronic gaming system including one or more physical gaming pieces that are used to determine gaming outcomes; a scanner that is configured to identify each of the one or more physical gaming pieces that are physically manipulated by a dealer or a player; a plurality of player computing equipment with graphical displays that are programmed to provide gaming interfaces for a plurality of players, the gaming interfaces each being programmed to provide electronic gaming action to a corresponding player based, at least in part, on the identified one or more physical gaming pieces, and a gaming computer system that is communicably connected to (i) the scanner, (ii) the plurality of player computing equipment, (iii) player accounts, and (iv) third-party providers of proposition player (TPPP) accounts. The gaming computer system can be programmed to, for a particular game, identify a TPPP that is assigned to cover gaming action on the game and players who are playing the game; determine gaming outcomes for each of the players based, at least in part, on the identified one or more physical gaming pieces; and reconcile the player accounts for the players and the TPPP account for the TPPP based on the determined gaming outcomes for each of the players.

Certain implementations can include one or more of the following optional features. The one or more physical gaming pieces can include physical playing cards. The one or more physical gaming pieces can include dice. The one or more physical gaming pieces can include physical objects that are used to determine gaming outcomes in slot machines. The gaming computer system can also be communicably connected to TPPP profiles for TPPPs that identify gaming strategies to be used for corresponding TPPPs. The gaming outcomes for each of the players can be determined further based on the TPPP gaming strategy of the corresponding TPPP for the game.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
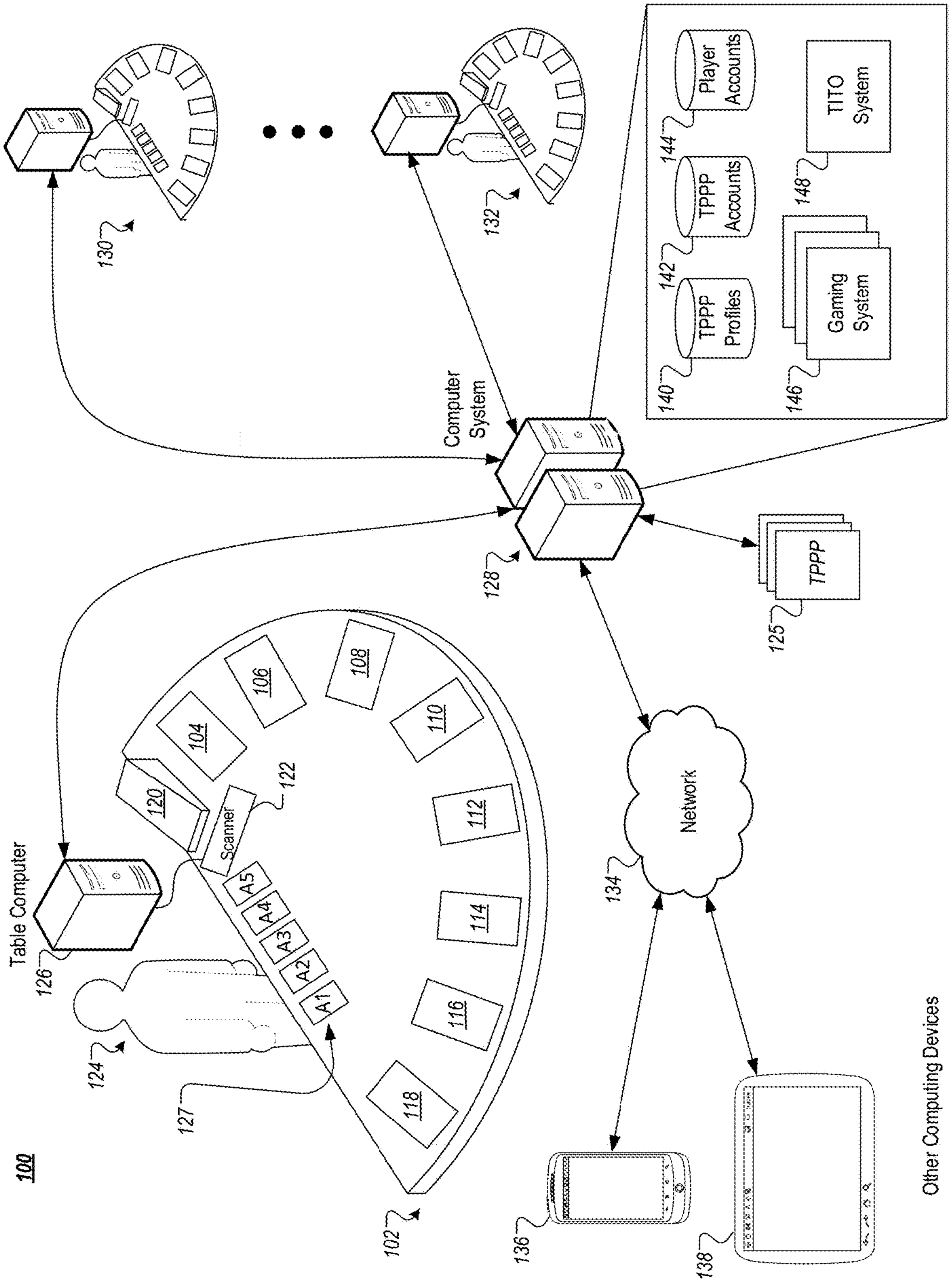
FIG. 1 is conceptual diagrams of an example card-based electronic gaming system employing a TPPP.

FIG. 1 is a conceptual diagram of an example card-based electronic gaming system 100 incorporating TPPPs 125, which can each include one or more computing devices and/or systems that provide electronic TPPP functionality across the gaming system 100. The system 100 includes an example gaming table 102 that includes computing devices/displays 104-118 that are located at each of the positions for the table 102. The table 102 also includes a scanner 122 configured to automatically detect cards that are dealt out of the shoe 120. The scanner 122 can be implemented in any of a variety of ways, such as an optical scanner that is configured to detect each card that is dealt from the shoe 120 through optical recognition of one or more unique portions of the cards (e.g., image recognition techniques to identify the suit and number for each card and/or to identify a code printed on each card, such as a barcode or Quick Response (QR) code), radio frequency-based identification (RFID) (e.g., recognition of RFID tags included in each card), and/or other identification techniques. In some implementations, the cards that are dealt out of the shoe 120 are specialized playing cards with one or more features (e.g., codes, RFID tags) that are specifically designed for detection by the scanner 122. In other implementations, the cards that are dealt out of the shoe 120 are standard playing cards without specially designed features. Once dealt, the dealt cards 127 can be employed by the system 100 to determine various gaming outcomes based on the dealt cards 127.

Card-based electronic gaming is provided at the table 102 through the use of a computing device 126 that, in combination with the scanner 122, detects the cards that are dealt from the shoe 120 by a dealer 124 (which can be a human, robot, or other mechanical dealing device/machine), manages gaming information and interactions through the devices/displays 104-118, and determines gaming outcomes based on the dealt cards 127 and the player actions (as designated through the devices/displays 104-118). In some implementations, the table computing device 126 may use prerecorded sequences of cards that are dealt as the dealt cards 127. The shoe 120 can store one or more decks of physical playing cards that are randomly ordered within the shoe 120 through physical shuffling of the cards (e.g., machine shuffling, manual shuffling, or a combination thereof).

Through these collective parts (table 102, computing device 126, scanner 122, shoe 120, dealer 124, devices 104-118) the system 100 can provide dealer assist electronic gaming to players through the use of physical cards as dealt (dealt cards 127), where the gaming outcomes are determined by the random ordering of physical playing cards within the shoe 120 instead of through a random or pseudo-random number generator.

One or more TPPPs 125 can be assigned to the table 102 through, for example, a central computer system 128 to cover the gaming action that takes place during each round or hand played at the table 102. The central computer system 128 can coordinate gaming across one or more tables 102, 130, and 132, with the TPPPs 125. The central computer system 128 can assign TPPPs to cover gaming action on the tables 102, 130, and 132 in any of a variety of ways, such as on a per-table basis (e.g., first TPPP is assigned to a table 102 and second TPPP is assigned to table 130), on a timed-basis (e.g., first TPPP is assigned to tables from 4 pm-12 am, second TPPP is assigned to tables from 12 am-8 am), on an amount of coverage/exposure (e.g., first TPPP is assigned to cover $1M in gaming action, second TPPP is assigned to cover $1.5M in gaming action), on bid amounts (e.g., first TPPP out-bids second TPPP to be assigned to tables for a period of time), and/or combinations thereof.

TPPPs 125 can interface with the computer system 128 through one or more computing devices (e.g., computer terminals, mobile computing devices, laptop, desktop computer), and when assigned to one or more of the tables 125, can actively monitor gaming on those tables. TPPPs 125 may monitor action on multiple gaming tables simultaneously through combined and/or aggregated displays showing/summarizing the gaming action on those tables. Such displays may be programmed to alert the TPPPs 125 when one or more scenarios occur, such as a total bet amount for a player and/or the table exceeding a threshold value, instances of likely advantage players (e.g., card counting), and/or other anomalies that may warrant attention.

In some embodiments, each of the TPPPs 125 can have one or more displays (e.g., monitors, touchscreens, virtual reality goggles, augmented reality glasses) that provide a user interface (e.g., graphical user interface (GUI)) with multiple different portions associated with each of the gaming tables that the TPPP 125 monitors. This user interface can allow the TPPP 125 to monitor and manage the multiple gaming tables simultaneously, without having to switch between displays or interfaces to perform a function for a particular gaming table. The user interface can display on the TPPPs 125 the gaming tables that a corresponding TPPP monitors and manages, including making gaming decisions in the position of the house (e.g., gaming strategy decisions) and, in some instances, making gaming decisions when the TPPP assumes the role of a player (e.g., action buys, color buys, reverse color buys, courtesy bets, dia mo bets). This allows for seamless functionality and ease in monitoring and managing all gaming tables associated with the TPPPs 125. TPPPs 125 can use this same user interface to add more gaming tables to monitor or manage. As a result, functions relating to each of those gaming tables can be presented, for example, in split sections associated to each particular gaming table within the user interface for the TPPPs 125. In some embodiments, a first portion of the user interface can show a first gaming table the TPPP 125 is managing at while a second portion of the user interface can show a second gaming table the TPPP 125 is managing. Bot the first and second portions of the user interface can change over time as the game progresses, and can provide the TPPP with options for managing the first and second gaming tables, including paying out players at those tables, performing gaming decisions for the gaming tables, selecting automated rules to use for the gaming tables, modifying automated and/or otherwise traditional gaming rules at the tables, and create one or more new TPPP 125-specific rules to apply to the gaming tables.

The computer system 128 can maintain TPPP profiles 140, TPPP accounts 142, and player accounts 144, and can include one or more gaming systems 146 (e.g., dealer-assist gaming systems, slot machines), and/or a TITO system 148. The TPP profiles 140 can include information identifying particular house/dealer strategies that particular TPPPs 125 have designated for the gaming systems 146 to use when the TPPPs 125 are assigned to cover gaming action on the gaming systems 146. For example, in a blackjack-type game, a TPPP profile 140 can designate various strategies for the gaming system 146 and assigned tables 102/130/132 to use, such as whether to hit on a soft 17. The TPPP accounts 142 can be monetary accounts for the TPPPs 125 that are used to cover gaming action on the tables 102/130/132, and the player accounts 144 can be gaming balances for players, which can be designated by tickets in the TITO system 148 and/or through loyalty/gaming accounts with a gaming facility. The computer system 128 debits and credits gaming outcomes to the player accounts 142 from the corresponding TPPP account 140 for the TPPP 125 who is assigned to cover gaming outcomes on the table/game at that time. For example, when players win or lose on the table 102, player accounts 142 for those players receive a debit or credit from the TPP account 142 for the TPPP 125 assigned to the table 102 at that point in time based on the gaming outcomes, as determined by the gaming system 146 using the TPPP profile 140 for the assigned TPPP 125.

The debts and credits to a player's account 144 from the TPPP account 142 may be facilitated through table computing device 126 and/or the computer system 128. For example, when a player device, such as player device 104-118, enrolls to play a game at table 102, the player associated with the device is determined eligible to play the next round or hand based on the account information 144 accessible through table computing device 126 and/or the computer system 128. When the player is determined to be eligible to play, the player's TPPP account 144 is debited the amount required to the current game. This may be facilitated through the table computing device 126 and the computer system 128, and can be reconciled to a player's account for the entire establishment. For example, a player may purchase a certain amount of virtual chips at the establishment employing electronic gaming system 100. When that player requests, through a gaming device, to play a game at table 102, table computing device 126 and/or the computer system 128 reconciles the player's account 144 for the establishment. Once gaming actions are completed, table computing device 126 and/or the computer system 128 can facilitate reconciliation of credits and further debits with the player's account and the TPPP account 142 for the TPPP 125 assigned to cover the gaming action at the table 102. In similar manners, TPPP 125 may cover the gaming action at tables 130 through 132. Other TPPP's may also be employed to cover gaming action at different tables, such as tables 130 through 132, within the electronic gaming system 100.

The use of different TPPP's at various tables within the electronic gaming system 100 can be transparent to the players through table computing device 126, which is used in the system 100 to reconcile the gaming outcomes and settle balances with the associated TPPP at each of the gaming tables 102 and 130 through 132, in the system 100. For example, the identity of the TPPP 125 that is covering the gaming action on a table, as well as the particular gaming strategies that are being used for that TPPP (as dictated by the TPPP profiles 140) can be presented to the player on the gaming devices 104-118.

As mentioned above, the particular rules that a dealer 124 will follow to play hands/provide gaming action at table 102 can be selected by the TPPP 125 assigned to cover the game at the table, as designated by the TPPP profiles 140. For example, the rules for a dealer to follow for blackjack can determine how the dealer is to play particular hands. As one example, the rule may determine whether the dealer takes another card on a "soft" seventeen (e.g., an ace and a six). These rules allow each of the TPPPs 125 the ability to govern the way play and action is performed by the dealer for the game that they are covering. The TPPP's identity as well as the particular dealer rules for the game (e.g., as indicated by TPPP profiles 140) selected by the TPPP 125 can be made available to players through various ways on the players devices 104-118 as well as the remote devices 136-138.

In addition to facilitating the reconciliation of balances between the TPPP 125 and the players, the table computing device 126 determines initial and next gaming outcomes for each player computer device 104-118 and remote computer devices 136-138 based on the cards in dealt cards 127 for both card based and non-card based games. Examples of card based table games include, but are not limited to, Baccarat, Blackjack, Casino war, Faro, Poker and its variants, Red Dog, Teen Patti, and Trente et Quarante. Examples of non-card based table games include, but are not limited to, Chuck-a-luck, Craps, Pai Gow, Sic bo, Big Six wheel, Roulette, Fan-Tan, and Two-up.

TPPP 125 may be assigned to a particular game or table and can be rotated in and out after a certain number of hands based, on a set time frame (e.g., for 7 pm-10 pm on a particular evening). In this way, the gaming establishment, can facilitate access to the tables by the system 100 to a number of TPPPs that are wanting to provide services to the players at the establishment. Each player's computing device 104-118 may present to the particular player, on the graphical user interface, an option to become a TPPP 125 for that particular game or table or another game or table at appropriate intervals. For example, the computer system 128 can rotate through the players at the table 102 by providing each of them with the option to be the TPPP 125 via a prompt presented on the player computing devices 104-118. When presented with such a prompt, each player can agree to become a TPPP 125 or pass. If the particular player passes (e.g., refuses to become a TPPP 125), then the next player at the table 102 can be asked to become a TPPP 125. This may be the player to the right or to the left of the player that passed, depending on the setup and arrangement of the game and/or table. If the player agrees to become TPPP 125 for that particular game or table or another game or table, then the player may be prompted with several preliminary functions or options. Examples of these preliminary functions may be how much that player is willing to put up for the particular game or table as the banker (or TPPP), what rules the player will adopt for the particular game or table, whether the player will select automated, traditional rules, or whether the player will define and customize rules for the particular game or table. That player may also be presented with an option to waive passing the option to become a TPPP 125 to a next player at the table or game. This allows for all players of a game or table to have the opportunity to be a TPPP 125 for that particular game or table or any other existing game or table.

In addition to taking on the role of the banker (TPPP), players at the table 102 can be provided with selectable options through their graphical user interfaces on the computing devices 104-118 to take on additional and/or alternative gaming action related to the banker, which may be the TPPP and/or other players who are playing on a table (either directly or remotely). For example, players may select an "action buy" option which permits for the player to take on the role of the banker for a hand/position at the table, and for the banker to provide the action for the hand/position. With an action buy, the banker (who may be the TPPP or another player at the table) effectively places a wager on a hand/position and the player who requested the action buy backs the action. If the hand/position where the banker has placed the wager wins, then the player pays the banker for the amount that the banker has won. If the hand/positon where the banker has placed the wager loses, then the player who requested the action buy collects the banker's wager. Action buys may be limited to particular types of games at a table (e.g., blackjack, pai gow poker) and may also include a corresponding per hand/position fee that the player is required to pay in order to assume the role of the banker. The banker may select the hand/position to which the action buy applies, and in some instances the banker may play the hand/position directly (making gaming decisions for hand/position) and/or indirectly (applying predetermined gaming strategy to hand/position).

Other example additional/alternative gaming actions for TPPP tables that can be provided to players through the graphical user interfaces can include color buys, reverse color buys, courtesy bets, holding seat/reserving right to bank, dai mo bets, and/or others. Color buys are similar to action buys in that they permit a player to assume the role of the bank for a particular hand and for the banker (who may be the TPPP and/or other player at the table) to provide action for the player. With color buys, though, the player can select any position at the table where the banker will place the wager as a side bet on top of the existing wager at that position. The player then backs the banker's action and, if the position where the banker wagered the color buy wins, pays winnings from the action to the banker. Like action buys, with a color buy the player collects the bankers wager if the position where the banker wagered loses. Also like with action buys, players pay a fee per to request a color buy. Reverse color buys are where a player places a wager that is beyond the table maximum for the banker, and the TPPP covers the portion of the wager in excess of the table maximum. Again, there is a fee associated with the TPPP covering a reverse color buy. Courtesy bets are when a player acting as the banker, requests that the TPPP place a wager against the banker without requiring a fee to be paid by the player. Courtesy bets may be provided at the discretion of the TPPP. Holding a seat/reserving the right to bank can be when a TPPP who is currently not acting as the banker places bets at a table in order to preserve the TPPP's right to be the banker when the option becomes available. The TPPP in these instances, the TPPP may play according to one or more predetermined strategies, including surrendering, folding, playing basic strategy, and/or other predictable strategies designed to maintain eligibility to bank while minimizing losses. A dia mo bet can be offered when a player acting as a banker chooses to not bank against specific wagers and/or seats at the table, such as those occupied by the banker's friends. In such instances, the TPPP can selectively back those hands/positions that the banker elects not to back. Example user interfaces for player gaming stations (devices 104-118, devices 136-138) that provide these features are described below with regard to FIGS. 6-10. Example user interfaces for TPPP stations (TPPPs 125) that provide these features are described below with regard to FIGS. 11-14.

The system 100 can additionally incorporate and permit remote players to play various games on the tables 102, 130, and 132 being covered by TPPPs 125, such as through other computing devices 136-138 (e.g., smartphones, tablet computing devices, wearable devices, desktop computers, laptop computers, media computing devices, video gaming systems, virtual reality systems, augmented reality systems). For example, the system 100 can use the central computer system 128 to connect remote players with the table computing device 126 so that remote players can additionally participate in an electronic game on the table 102. Such remote players may be located in the same facility as the table 102 (e.g., casino, card club, horse track) and/or remote from such a facility (e.g., located remotely, at home). Via the devices 136 and 138, the remote players can connect to the computer system 128 and the table computing device 126 to participate in an electronic game at the table 102 and/or other tables 130-132 over one or more networks 134, such as the internet, local area networks (LAN), wide area networks (WAN), virtual private networks (VPN), mobile data networks (e.g., 4G LTE networks), wireless networks (e.g., Wi-Fi networks, BLUETOOTH networks), and/or combinations thereof. The remote device 136 and 138 can download and run code from the computer system 128 to provide electronic gaming on the devices 136 and 138 (e.g., provide user interfaces to establish/login to user accounts, to designate bet amounts, to present the initial hand, to receive keep/discard action, to present the final hand based on the received draw cards, to determine gaming outcomes based on the final hand, and to allocate winnings to the player account). Such code can be, for example, a mobile application ("mobile app") that is downloaded and installed on the computing devices 136 and 138, a browser-based application that is downloaded and run within a web browser application on the computing devices 136 and 138, a standalone application that is downloaded and installed on the computing devices 136 and 138, and/or other types of code and/or applications.

The computer system 128 can additionally distribute video, audio, and/or chat feeds for the tables 102 and 130-132 to remote players using the computing devices 136 and 138.

Figure 2:
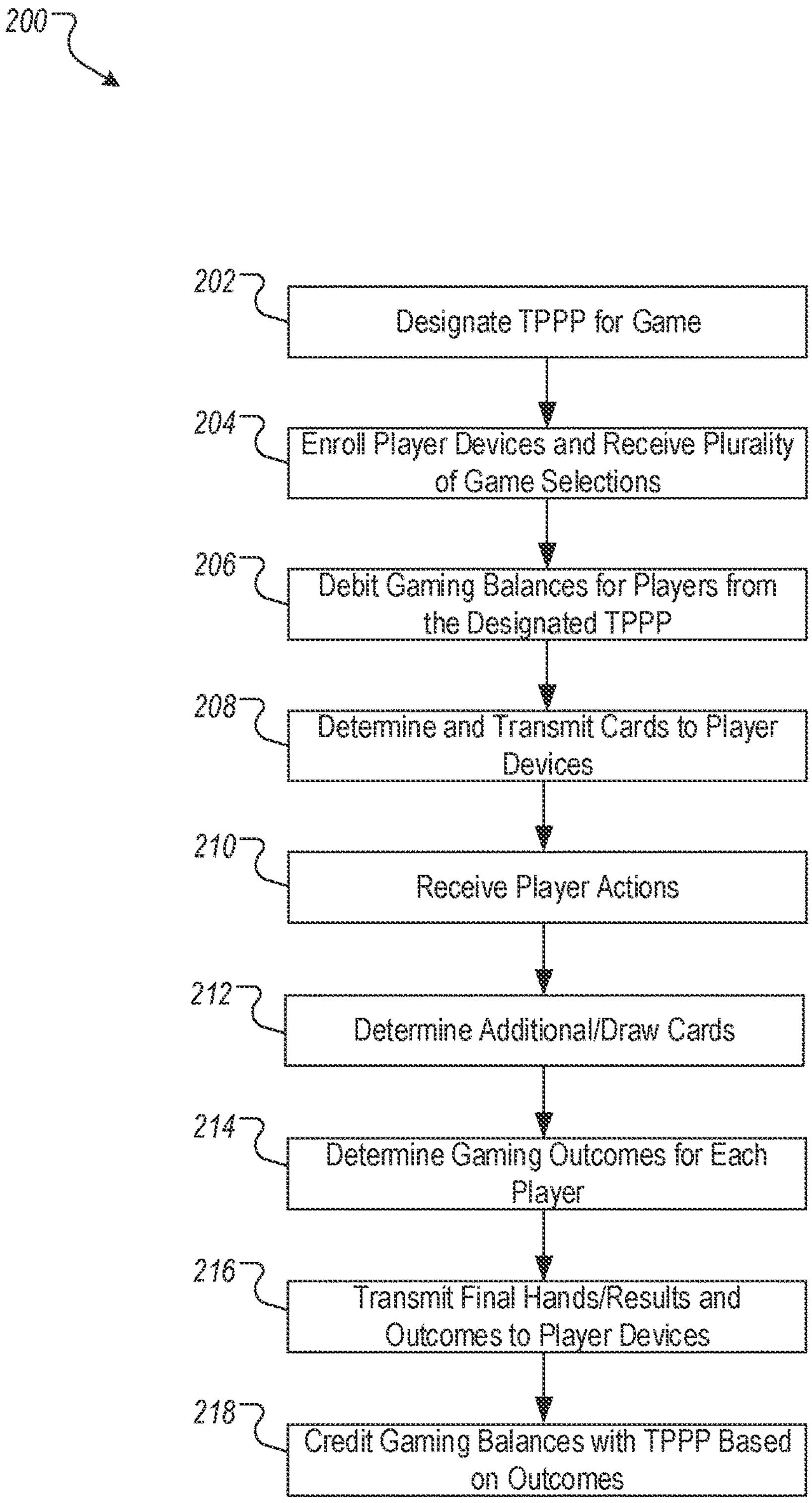
FIG. 2 is a flowchart of an example technique for performing card-based electronic gaming using a TPPP.

FIG. 2 is a flowchart of an example technique 200 for performing card-based electronic gaming using a TPPP. The example technique 200 can be performed by any of a variety of appropriate computing devices and/or systems, such as the table computer system 126, the computing devices 104-118 and 136-138, and/or the computer system 128.

A TPPP is designated (202) for the next game played at table 102. For example, a TPPP may be assigned to covering the action at a specific table or group of tables within an establishment. Alternatively, a TPPP may be assigned to covering the action for a particular game or games played at a table (see e.g., FIG. 4). For example, multiple games may be played at a table 102 where one TPPP is assigned to cover the first game and another TPPP is assigned to cover a second game at the same table. In yet another example, a TPPP may be slotted to cover games at a table(s) for a certain period of time according to an agreement with the gaming establishment.

Player devices that are going to play an electronic game can be enrolled and their game selections received (204). Debits for playing the game can be taken against gaming balances for each of the players (206) for the particular TPPP 125 assigned to cover the game or table. The computing device 126 and/or the computer system 128 may facilitate reconciliation of balances between the TPPP accounts 142 and the player accounts 144, which may be initially loaded with a gaming balance, for example, by players purchasing credits and/or virtual chips. For example, the computing devices 104-118 and 136-138 can enroll with the computing device 126 and/or the computer system 128 to play in a next hand of a selected game(s) on the table 102, and a debit/ante to play the game can be taken from each player's virtual gaming balance for the TPPP 125 assigned to the game for that hand.

Enrolling a new player can include, for example, the player either creating or providing player account information via the computing devices 104-118 and 136-138. For example, a new player may create a new player account 144 by physically and/or electronically depositing money via the computing devices 104-118 and 136-138, the computing device 126, and/or the computer system 128 (e.g., feeding physical money into a bill reader device that is part of/connected to the computing devices 104-118, providing credit/debit card information, providing bank account information). This account 144 can be used to reconcile debits and credits with each individual TPPP account 142 covering gaming action at a particular table(s). A unique account identifier can be created and funds deposited into the account 144 can be credited to the account by the computing device 126 and/or the computer system 128, for example, as part of the TITO system 148. Players with preexisting accounts can provide account information via the computing devices 104-118 and 136-138 through one or more input mechanisms, such as through a physical ticket reader (e.g., ticket reader to read unique account identifier encoded on the ticket), through a player card reader (e.g., magnetic strip reader, RFID reader), through input of a username and password, and/or through other input mechanisms. New players can be prompted through one or more selectable options to designate a type of electronic game they want to play and/or to designate a bet amount for the next hand. Players may also be prompted to provide a set of information to each TPPP assigned to cover the gaming actions at a table(s). Upon agreement from the player, the player's device may automatically transfer this information.

Enrolling existing players in a next gaming hand can include, for example, players either providing or not providing particular types of input within a threshold amount of time for the next hand to start. For example, in some instances players may have to opt-in to play a next hand, and can be provided with a time-limited selectable option to opt-in to game play for a next gaming hand at a table where the player just finished a hand. Failure to select the option within a threshold amount of time can cause the player to sit-out the next hand, although the player may be enrolled to play a next hand at another table. In other instances, the player may have to opt-out to avoid repeating his/her bet in a next hand, and can be provided with a time-limited selectable option to opt-out of game play for the next hand at a table. Failure to select the option within the threshold amount of time can cause the player to be automatically enrolled in the next hand at the same bet amount. Other opt-in and opt-out options are also possible, such as a player designating a bet amount for a next gaming hand as an implicit opt-in for a next hand. Existing players can additionally be provided with selectable options between hands to change the type of game that they are playing between and/or to change their bet amount.

The cards used by the table computing device 126 to determine initial hands for players through the players' respective devices can be determined and transmitted to the player devices that are enrolled in the game (208). For example, the table computing device 126 can determine an initial hand of cards based on a card order or placement of cards dealt from the shoe 120. The table computing device 126 can transmit information identifying the cards in each initial hand to the devices 104-118 and 136-138, which can present the cards on the displays (e.g., graphical user interfaces) to the players along with selectable options through which the players can, for example, designate which cards they will hold and which cards they will discard. If the player is playing in several games, the single display (e.g., graphical user interface) may provide the selectable options for a particular game within the split portion of the single display that is specific to the particular game. For example, if the player is playing two games, the first game comprises a left portion of the single display and the second game comprises a right portion of the single display. The first game in the left portion of the single display may present the cards along with selectable options through which the player can designate, for example, which cards he will hold and which cards he will discard. At the same time, the second game in the right portion of the single display may only present selectable options to make the next move in that particular game. In other words, both portions of the single display will be updated simultaneously to display the particular functions and other aspects according to each game the player is partaking in.

Each player may be presented with an initial hand and can make individual game decisions, such as for example, which cards to hold and which cards to discard. Players can employ different game play strategies, which may be dictated in part based on the type of game that each player has elected to play (e.g., some games payout for a pair of cards whereas others only begin paying out with three of a kind) as well as the bet amount that each player has placed for the hand (e.g., some outcomes can pay at increased multipliers for higher bet amounts). When the selected game includes player action(s), the players can provide their actions (e.g., hold, discard, hit) for the initial hand (210) to the devices 104-118 and 136-138, which can then be transmitted to, and received by, the table computing device 126. For example, discard selections can be received at the devices 104-118 and 136-138, and transmitted to the table computing device 126.

Additional cards may be dealt from the shoe 120 and detected (212) by the table computing system 126 through the scanner 122. The additional cards can be used as draw cards or as additional cards depending on the type of game being played. The additional/draw cards can be used to assemble a final hand for each player, which are used to determine (214) gaming outcomes for each player. For example, the devices 104-118 and 136-138, the table computer 126, and/or the computer system 128 can replace the discarded cards from the initial hand for each player with the drawn cards.

In some implementations, the players can be given a common timer (e.g., 15 seconds, 20 seconds, 30 seconds) to make their player action(s) (step 210) before additional cards are detected (step 212) and the final outcomes determined (step 214). The player's discard selections at the expiration of this timer will be locked in and used for determining the resulting hand, in combination with the additional cards. Players can be given the option to affirmatively "lock-in" their discard selections prior to expiration of the timer. If all players lock-in their discard selections in advance of the timer expiring, then the dealer can proceed with the draw cards without waiting for the timer to expire, which can permit the speed of play to increase.

The final hands for each player can be evaluated and the gaming outcome can be determined (214) for each player. For example, the devices 104-118 and 136-138, the table computer 126, and/or the computer system 128 can determine which of the final hands are winners and, if so, how much has been won by each player based on identification of the result of each of the final hands (e.g., pair, three of a kind, full house, flush), the type of game that each player is playing, a comparison of each player's result with the winning hands for the game each player is playing (e.g., winning hands start at pair of jacks or better, winning hands start at three of a kind), and identification of odds for winning hands based on the type of winning hand and/or the bet amount. The determination of whether a player has won and how much the player has won can be made, for example, at the devices 104-118 and 136-138, the table computer 126, and/or the computer system 128. As discussed above, the determination of whether a player has won is based on the physical deal of the card from the shoe 120, the player actions, and the gaming strategy used by the TPPP 125 assigned to the table (as indicated by the TPPP profile 140 for the assigned TPPP 125). This results in providing electronic gaming without the use of random or pseudo-random number generators.

Final hands and outcomes can be transmitted to, and presented on, player devices (216). For example, the devices 104-118 and 136-138 can either generate and/or receive information identifying the final hands and the gaming outcomes (e.g., win, win amount, lose), and can output that information on the displays to each player. Gaming balances for players with winning hands can be credited (218) to each player's account 144 and debited against the TPPP account 142 for the TPPP 125 assigned to cover the game. For example, the win amounts for players who have won based on the outcome of the final hands can be credited to corresponding player accounts 144, which may be identified by a unique identifier. The technique 200 can be selectively repeated for each individual player—with each iteration of the technique 200 corresponding to a completed game using dealt common cards.

Figure 3:
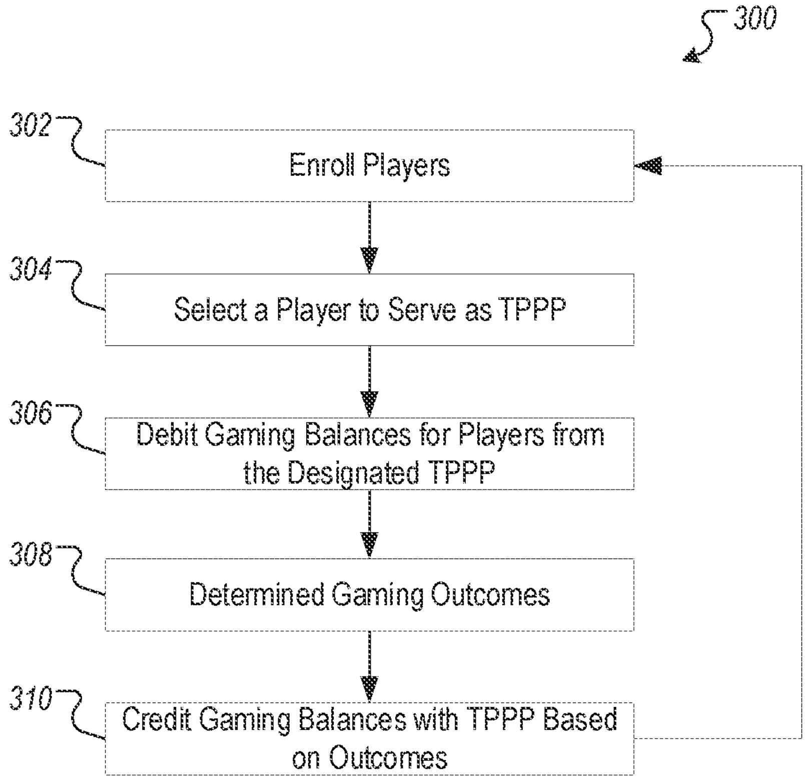
FIG. 3 is a flowchart of another example technique for performing card-based electronic gaming using a TPPP.

FIG. 3 is a flowchart of an example technique 300 for performing card-based electronic gaming using a player-option to be the TPPP 125. The example technique 300 can be performed by any of a variety of appropriate computing devices and/or systems, such as the table computer system 126, the computing devices 104-118 and 136-138, and the computer system 128. The example technique 300 allows for a player that is enrolled to play a game at a table, such as table 102, to serve as a TPPP 125 and cover the action for a hand or series of hands at the table.

Player devices that are going to play an electronic game can be enrolled and their game selections received (302). One of the enrolled players is designated (304) as the TPPP 125 for the next round or hand for the game played at table 102. The players may be selected based on eligibility according to an existing relationship or agreement between the player and the gaming establishment. To state this another way, players that want to server as a TPPP for a game may be required to provide some initial set up information to the gaming establishment and/or come to an agreement with the establishment regarding the nature and rules of the agreement. Alternatively, each player may designate, as discussed above, a set of rules for the dealer about when to take a card or hold and so forth. In other embodiments, each player at a table may be asked to serve as a banker for a game. In another embodiment, each or selective players may be asked to serve as a banker for a different game and/or table. As previously discussed, players are prompted with the option to be or serve as a banker on the single display of the player device, such as through interfaces described below with regard to FIGS. 6-10.

Debits for playing the game can be taken against gaming balances for each of the players (306) from the account of the particular TPPP 125 (player) assigned to cover the game or table. The computing device 126 and/or the computer system 128 may facilitate reconciliation of balances between the TPPP accounts for each player and an overall account used by the house where, for example, a play may purchase credits and/or virtual chips. For example, the computing devices 104-118 and 136-138 can enroll with the computing device 126 and/or the computer system 128 to play in a next hand of a selected game(s) on the table 102, and a debit/ante to play the game can be taken from each player's virtual gaming balance for the TPPP (player) assigned to the game. Enrolling new players and reconciliation of debits and credits with the assigned TPPP is similar to the way this is described in technique 200.

Gaming outcomes are determined (308) based on the cards dealt from the shoe 120 and the player actions. Gaming outcomes are determined in a similar manner as described in technique 200.

Gaming balances for players with winning hands can be credited (310) to each player's account for the TPPP 125 (player) assigned to cover the game. For example, the win amounts for players who have won based on the outcome of the final hands can be credited to corresponding TPPP user accounts, which may be identified by a unique identifier. The technique 300 can be selectively repeated for each hand for a game player at a table, such as table 102, wherein each iteration of the technique 300 corresponds to a completed game.

Figure 4:
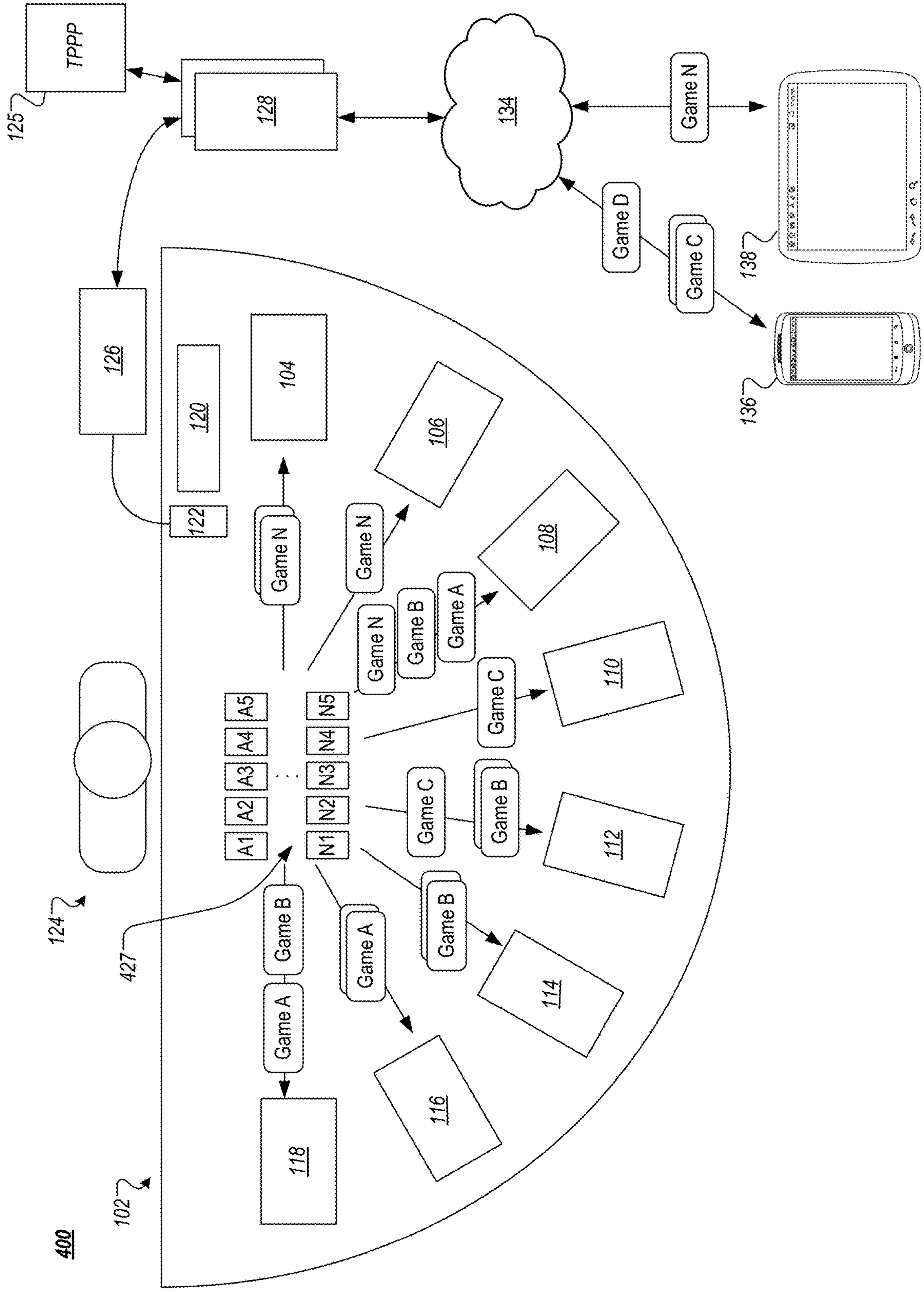
FIG. 4 is a conceptual diagram of an example configuration of a gaming table.

FIG. 4 is a conceptual diagram of an example game configuration 400 that can be played using TPPPs 125 to cover electronic gaming action on the gaming table 102. The example configuration 400 includes table 102 and the various components (e.g., computing devices/displays 104-118, shoe 120, scanner 122, dealer 124, computing device 126) employed to facilitate gaming at table 102 as well as the various components (e.g., central computer system 128, one or more networks 134) to facilitate remote gaming with remote devices such as computing devices 136 and 138. In the example configuration 400, card-based electronic gaming is provided at the table 102 through the use of a computing device 126 that, in combination with the scanner 122, detects the cards that are dealt 427 from the shoe 120 by a dealer 124 (which can be a human, robot, or other mechanical dealing device/machine), determines the position of each dealt card in the grid 427, manages gaming information and interactions through the devices/displays 104-118, and determines gaming outcomes based on the cards that are dealt and the player actions (as designated through the devices/displays 104-118). In the example configuration 400, the computing device 126 is programmed to use common cards across the players through the devices 104-118. In the depicted configuration 400, table computing device 126 and/or computer system 128 manages Games A-N for each of the devices 104-118 as well as remote devices 136-138.

In the example configuration 400, a TPPP 125 is assigned to cover actions for the games A-N played at the table 102. In alternative configurations, a TPPP 125 may be assigned to cover a particular set of games or just a single game played at the table 102. A TPPP 125 may even be assigned to cover a particular set of games or just a single game at another table. In some embodiments, a TPPP 125 may be assigned to cover the actions for Games A and B, while another TPPP 125 may be assigned to cover the actions for Games C-N at the same table. Other combinations of TPPPs and games played and/or covered at a table 102 or different tables are possible.

The size and shape (i.e., the number of columns and rows) for grid 427 may vary based on the type of game(s) offered by example configuration 400 and/or the number of players supported by system 100. The dealer 124 may place each card as dealt from the shoe 120 into the grid 427 based on a particular pattern. For example, the first card may be placed in position A1, the second card may be placed in position A2, and so forth, until the grid is filled. As an alternative example, the first card may be placed in position N5, the second card may be placed in position N4, and so forth until the grid is filled. Any number of patterns may be employed to fill the grid. The pattern can be switched by the dealer 124 after each grid is used to determine gaming outcomes, or after a particular number of grids have been dealt and used. The patterns used for card placement into the grid 427 may be rotated through based on a particular ordering of the patterns. Grid 427 may also be built virtually by table computing device 126 as the cards are dealt by the dealer and read by the scanner 122, or based on a pre-recorded dealt sequence of cards.

The dealer 124 may also deal a second grid 427 of cards from which the additional or replacement cards can be selected by the table computing device 126. The second grid 427 may be dealt according to the same pattern and the first grid, or a different pattern. For example, A1 can be applied for the first card discarded from an initial hand, A2 can be applied for the second card discarded, A3 for the third, A4 for the fourth, and A5 for the fifth. So, if the player using device 104 decided to discard one card from the initial poker hand, then the discarded card is replaced with A1. Similarly, if the player using device 106 decided to discard two cards from the initial poker hand, then the discarded cards are replaced with A1 and A2, and so on. Alternatively, if the player using device 106 decided to discard two cards from the initial poker hand, then the discarded cards are replaced with A2 and A3 (because A1 was provided to the first player), and so on.

Each of the player devices 104-118, which can be any of a variety of computing device with an associated display (e.g., tablet computing device, embedded computing device), can present the initial hand selected from the grid 427 to each player along with selectable options to discard some, none, or all of the cards. For example, the devices 104-118 can include touchscreens that present selectable buttons to discard or keep each of the initial cards. In another example, the devices 104-118 can include physical buttons corresponding to each of the initial cards through which the player can designate which cards to keep or discard. Player actions can be maintained locally on the devices 104-118 and/or can be transmitted to the table computing device 126.

The table computing device 126 and/or the player devices 104-118 can determine the outcome of the game for each player based on the initial hand, the player's actions (e.g., cards designated for discard), and the draw cards selected from the grid 427. In some implementations, the table computing device 126 (in combination with a central computer system 128) can determine and manage gaming at each of the positions, and can simply use the devices 104-118 to present information to the players and to obtain player inputs (e.g., discard selections, bet amounts). In other implementations, each of the devices 104-118 can manage an individual player's gaming and can communicate with the table computing device 126 to receive card information. Other implementations are also possible.

The example configuration 400 can incorporate and permit remote players to play on the table 102, such as through other computing devices 136 and 138. For example, the system 100 can use the central computer system 128 to connect remote players with the table computing device 126 so that remote players can participate in gaming on the table 102. Such remote players may be located in the same facility as the table 102 (e.g., casino, card club, horse track) and/or remote from such a facility (e.g., located remotely, at home).

The example configuration 400 can additionally and/or alternatively be used for other types of games. For example, the system 100 can be used to provide blackjack gaming, other types of poker gaming, slots, and/or other types of games for a large number of users through common cards.

The example configuration 400 can credit and debit gaming outcomes against the player accounts 144 and the TPPP accounts 142 for the TPPP(s) 125 assigned to cover gaming action on one or more of the games A-N provided on the table 102.

Figure 5:
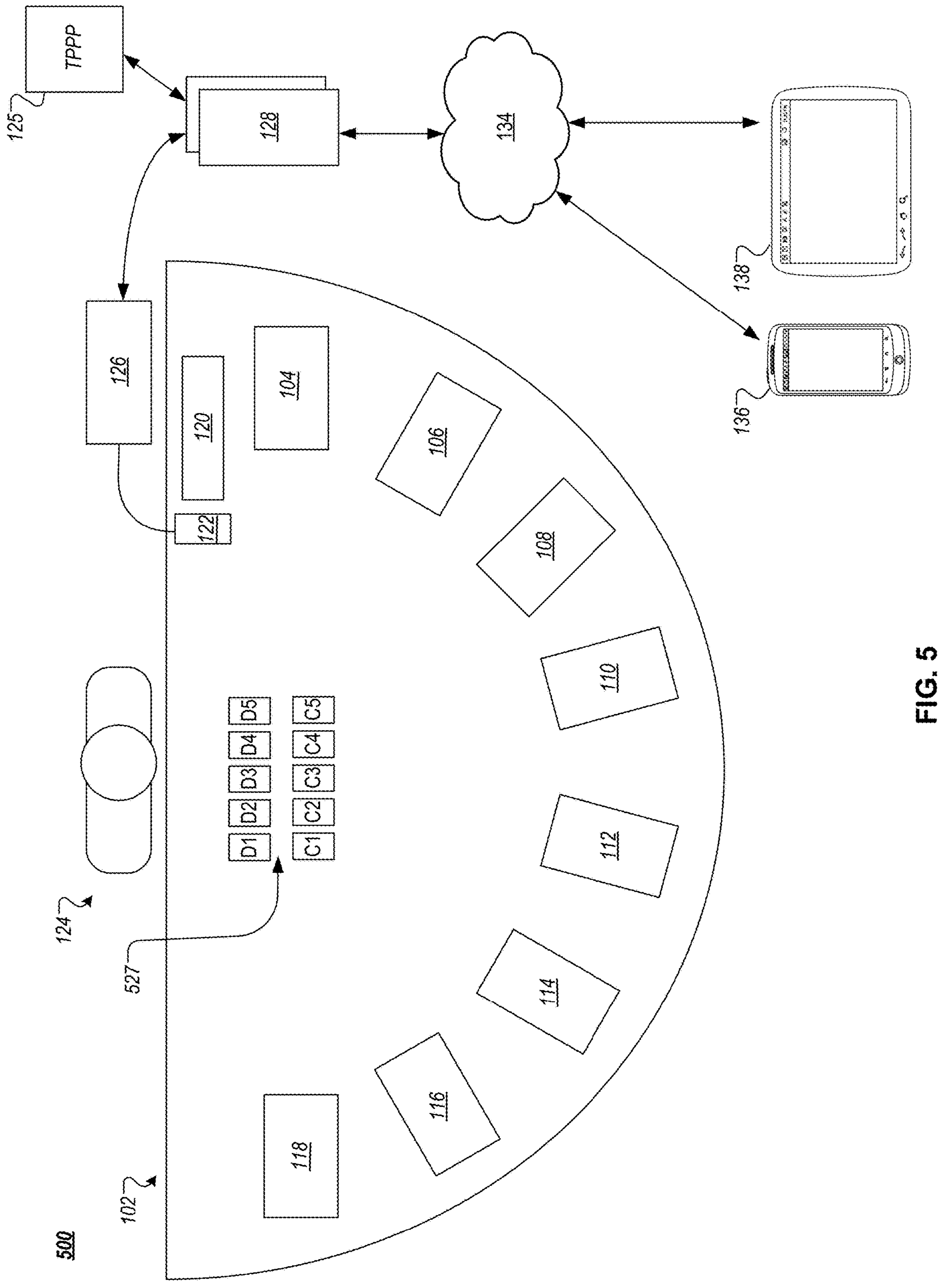
FIG. 5 is another conceptual diagram of an example configuration of a gaming table.

FIG. 5 is a conceptual diagram of another example game configuration 500 of gaming table 102 that provides card-based electronic gaming covered by one or more TPPPs 125. The example configuration 500 includes table 102 and the various components (e.g., computing devices/displays 104-118, shoe 120, scanner 122, dealer 124, computing device 126) employed to facilitate gaming at table 102, as well as the various components (e.g., central computer system 128, one or more networks 134) to facilitate remote gaming, including remote computing devices 136 and 138. In the example configuration 500, card-based electronic gaming is provided at the table 102 through the use of a computing device 126 that, in combination with the scanner 122, detects the cards that are dealt 427 from the shoe 120 by a dealer 124, manages gaming information and interactions through the devices/displays 104-118, and determines gaming outcomes based on the cards that are dealt and the player actions (as designated through the devices 104-118 by their single displays).

In the example configuration 500, a TPPP 125 is assigned to cover actions for the game played at the table 102. By way of example(s), the assigned TPPP 125 may cover the actions for the table during a particular time frame (e.g., from 7 pm-10 pm) or for a determined number of games. When the time and/or number of games is complete and/or ends, another TPPP 125 may step in or be assigned to cover the actions at the table 102. Each TPPP 125 may complete an agreement with the gaming establishment about the time-frame and/or number of games the TPPP 125 covers. As a result, the gaming actions for the table are determined based on that agreement. A gaming establishment may choose to adopt other mechanisms to assign a TPPP 125 to the table(s) and/or game(s).

In the example configuration 500, the computing device 126 is programmed to use common cards across the players through the devices 104-118. For example, the computing device 126 can detect an initial hand of cards C1-C5 dealt by the dealer 124 and can transmit information identifying the cards C1-C5 to the player devices 104-118. Each of the player devices 104-118, which can be any of a variety of computing device with an associated display (e.g., tablet computing device, embedded computing device), can present the initial hand C1-C5 to the players along with selectable options to discard some, none, or all of the cards C1-C5. For example, the devices 104-118 can include touchscreen single displays that present selectable buttons to discard or keep each of the cards C1-C5. Such touchscreen single displays may also offer other functional options and/or selectable buttons per game that the player is playing in. In another example, the devices 104-118 can include physical buttons corresponding to each of the cards C1-C5 through which the player can designate which cards to keep or discard. Player actions can be maintained locally on the devices 104-118 and/or can be transmitted to the table computing device 126.

Once all player actions have been received and/or after expiration of a time period for players to enter their actions, the dealer 124 can deal another set of cards 427 represented by D1-D5, which can be detected by the table computing device 126 (via the scanner 122) and applied across the players' hands based on their individual actions through the devices 104-118. The cards D1-D5 can be applied in an order in which they are dealt. For example, D1 can be applied for the first card discarded from the hand C1-C5, D2 can be applied for the second card discarded, D3 for the third, D4 for the fourth, and D5 for the fifth. So, if the player using device 104 decided to discard one card from the initial hand C1-C5, then the discarded card is replaced with D1. Similarly, if the player using device 106 decided to discard two cards from the initial hand C1-C5, then the discarded cards are replaced with D1 and D2, and so on.

The table computing device 126 and/or the player devices 104-118 can determine the outcome of the game for each player based on the initial hand C1-C5, the player's actions (e.g., cards designated for discard), and the draw cards D1-D5. In some implementations, the table computing device 126 (in combination with a central computer system 128) can determine and manage gaming at each of the positions, and can simply use the devices 104-118 to present information to the players and to obtain player inputs (e.g., discard selections, bet amounts). In other implementations, each of the devices 104-118 can manage an individual player's gaming and can communicate with the table computing device 126 to receive card information. Other implementations are also possible.

The example configuration 500 can additionally incorporate and permit remote players to play on the table 102, such as through other computing devices 136 and 138. For example, the system 100 can use the central computer system 128 to connect remote players with the table computing device 126 so that remote players can additionally participate in gaming on the table 102. Such remote players may be located in the same facility as the table 102 (e.g., casino, card club, horse track) and/or remote from such a facility (e.g., located remotely, at home).

The example configuration 500 can additionally and/or alternatively be used for other types of games. For example, the system 100 can be used to provide blackjack gaming, other types of poker gaming, slots, and/or other types of games for a large number of users through common cards.

The example configuration 500 can credit and debit gaming outcomes against the player accounts 144 and the TPPP accounts 142 for the TPPP(s) 125 assigned to cover gaming action being provided on the table 102.

FIGS. 6-10 are example graphical user interfaces (GUIs) that can be presented on player gaming devices to provide TPPP-related gaming features. The example GUIs that are depicted in FIGS. 6-10 can be provided on any of a variety of appropriate player gaming equipment, such as devices 104-118, 136-138, and/or other appropriate devices. The GUIs that are depicted in these figures can be presented on any of a variety of display devices, such as touchscreen displays, mobile displays, wearable displays, stationary displays, and/or others. Any of a variety of corresponding user input devices can be associated with the interfaces to receive user input, such as physical buttons and/or keys, touchscreen features (e.g., virtual buttons, selectable icons), motion and/or gesture-based features (e.g., accelerometers, cameras), voice-based features (e.g., microphones), and/or combinations thereof.

Figure 6:
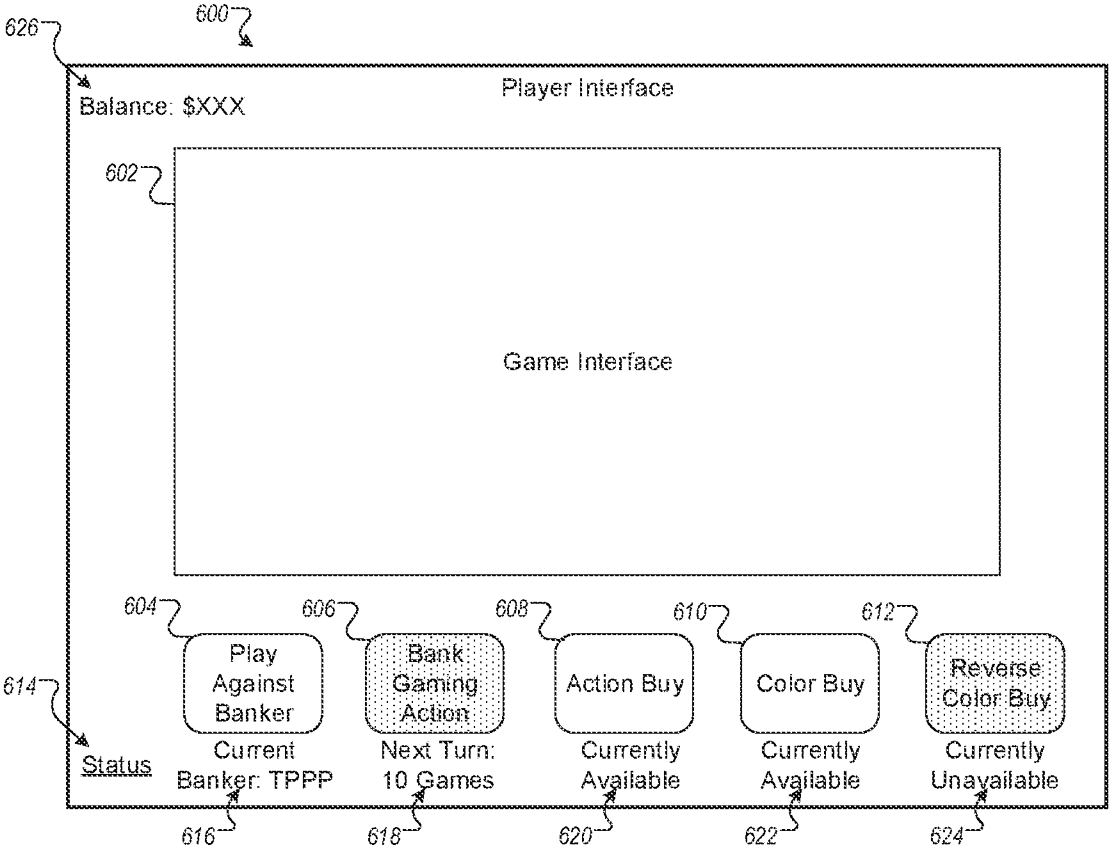
FIGS. 6-10 are example graphical user interfaces (GUIs) that can be presented on player gaming devices to provide TPPP-related gaming features.

Referring to FIG. 6, an initial player interface 600 is presented with a game interface 602 through which one or more games can be presented and played by the player. The player interface 600 also includes TPPP-specific selectable features 604-612 that can be activated and/or deactivated based on the current status 614 of those options at the table. Any of a variety of TPPP-related features can be presented, such as playing against the current banker (604), banking the gaming action (606), selecting an action buy (608), selecting a color buy (610), selecting a reverse color buy (612), and/or others. Playing against the current banker (604) can be selected for a player to place a more traditional wager on a hand/position that is being backed by the current banker, which may be the TPPP or another player at the table. As indicated by the example status (616), the current banker is the TPPP.

As shown in the depicted example, the selectable button 606 to back gaming action (assume the role of the banker) is currently deactivated since the option is not currently being offered to the player, as indicated by the example status 618 (next turn to be banker in 10 games/hands). This selectable button 606 can change to being activated and selectable by the player when it is the player's turn to assume the role of the banker (which the player may elect against), and/or the player can selected it in advance of his/her turn in order to preselect his/her option to bank when it becomes available. The button 608 can be selected to perform an action buy and the button 610 can be selected to perform a color buy, which the status 620-622 indicates are both currently available. The action buy and color buy features can be selectively activated and/or deactivated on the banker's device, and/or may not be available with some types of games. The button 612 is currently deactivated in this example (as indicated by the example status 624), but when activated permits a player to perform a reverse color buy. The reverse color buy can additionally be activated and/or deactivated on the banker's device.

The interface 600 can additionally include balance information 626 providing a current balance of gaming funds available to the player. The balance information 626 can be maintained locally on the player's gaming equipment in addition to being maintained on a gaming computer system, such as the computer 126 and/or the computer system 128.

Figure 7A:
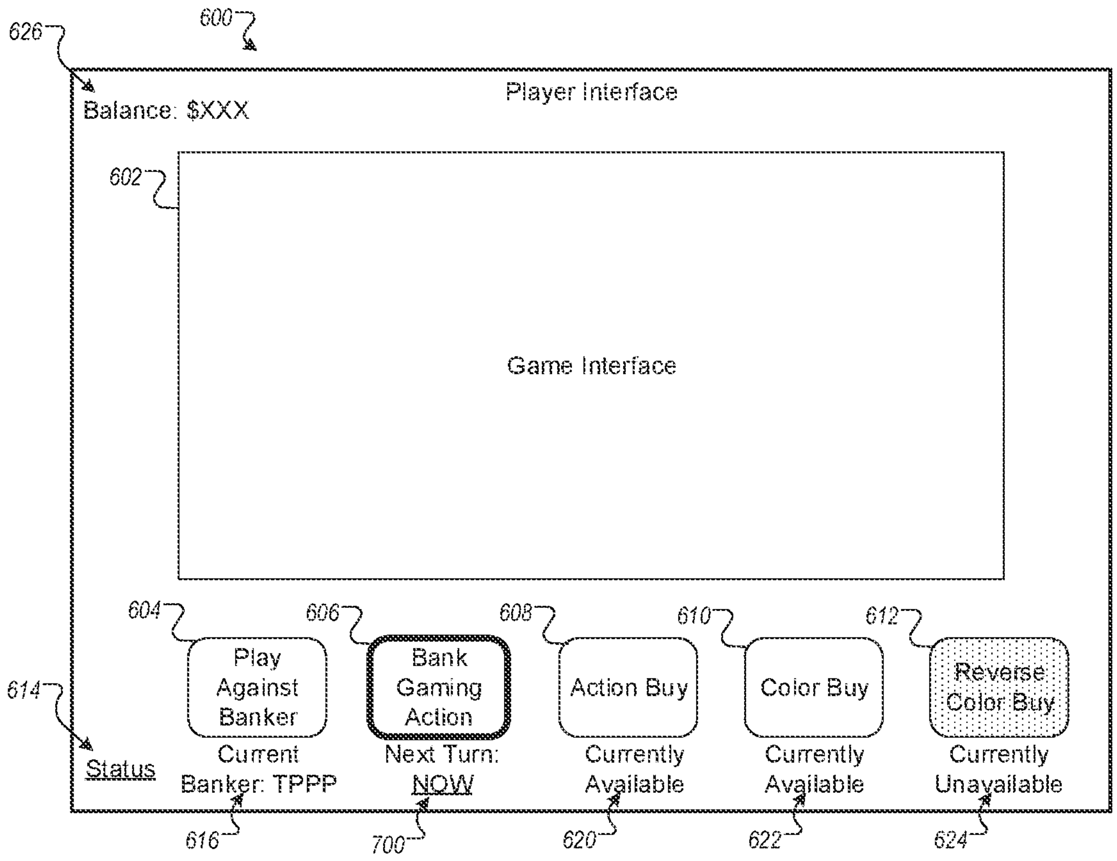
Figure 7B:
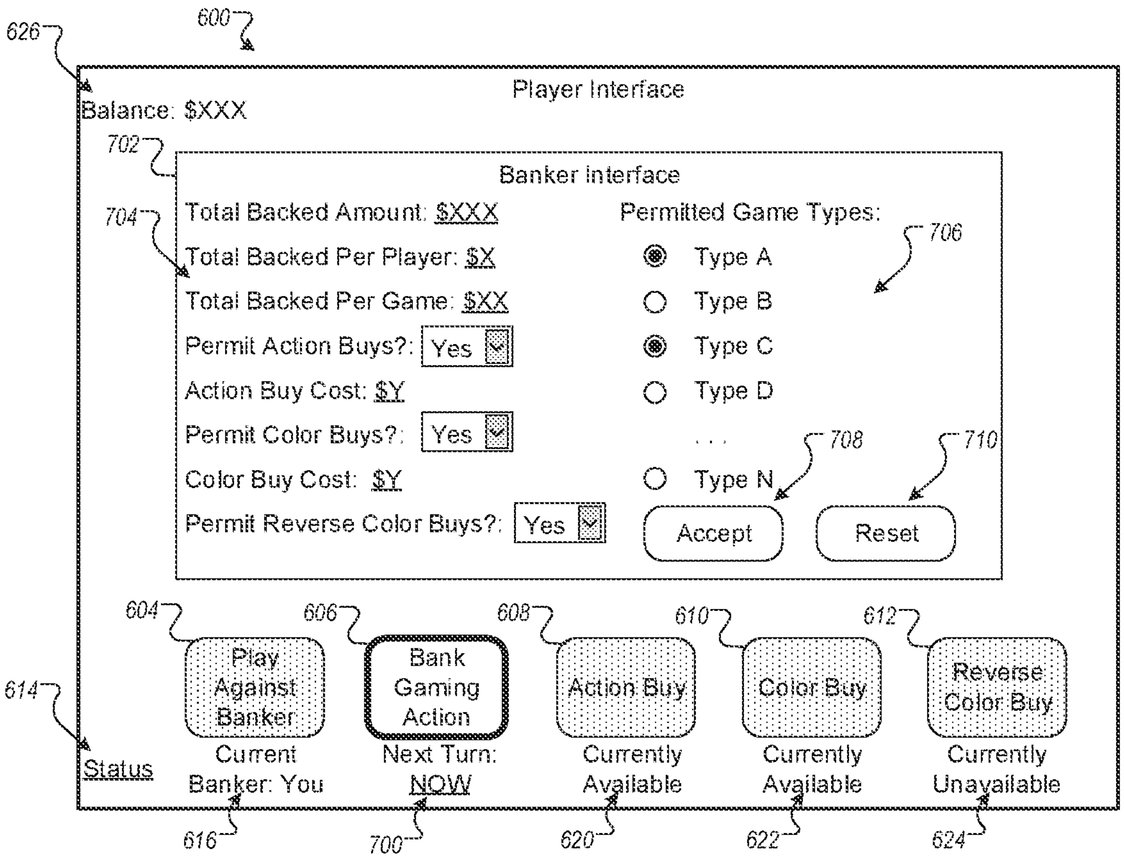

Referring to FIG. 7A, an example of the player interface 600 is presented in which the player now has the option to bank the game (as indicated by status 700) and has selected the button 606 to proceed with taking on the role of the banker. Referring to FIG. 7B, after the player has selected the button 606, the player can be presented with a banker interface 702 through which the player can designate parameters for his/her banking session, including total amount being backed by the player, total being backed per player, total being backed per game/hand, whether action buys are permitted, the fee for a player to buy action, whether color buys are permitted, the fee for a color buy, and/or whether reverse color buys are permitted. The banker interface 702 can also include features 706 of the player to select one or more types of games (e.g., blackjack, pai gow poker, draw poker) that the players can select for the banked game. The interface 702 further includes options to accept 708 the settings (which may be initially filled with default values and/or preset values for the player) and/ot to reset them 710. Once accepted, the settings can be transmitted to the game computer system (e.g., computer 126, computer system 128) to provide the gaming action with the player as the banker. Note that, when the player is acting as the banker, the other selectable TPPP options 604 and 608-612 can be deactivated.

Figure 7C:
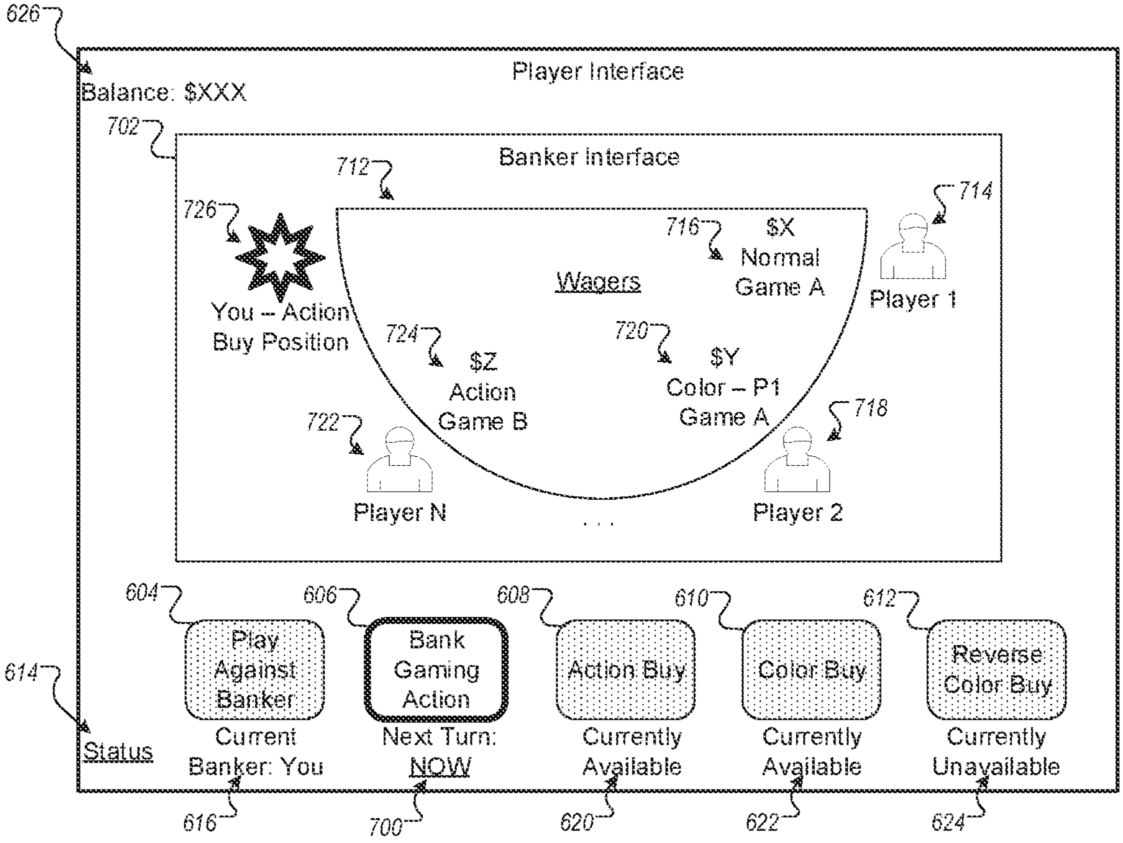

Referring to FIG. 7C, the banker's interface 702 includes an example graphical display showing the current gaming status on the table 712, which includes players 1-N represented by graphical icons (714, 718, and 722) and the current wagers being placed by the players (716, 720, 722). In the depicted example, player 1 (714) is playing game type A in a normal/traditional role (player is wager on outcome of his/her hand) with a wager of $X. The status 720 for player 2 (718) indicates that player 2 has placed a color buy on the outcome of player 1's position/seat in the amount of $Y. The status 724 indicates that player N (722) has placed an action buy for game type B in the amount of $Z. The action buy seat/position where the player (currently acting as the banker) will provide action for such an action buy is identified by icon 726.

Figure 7D:
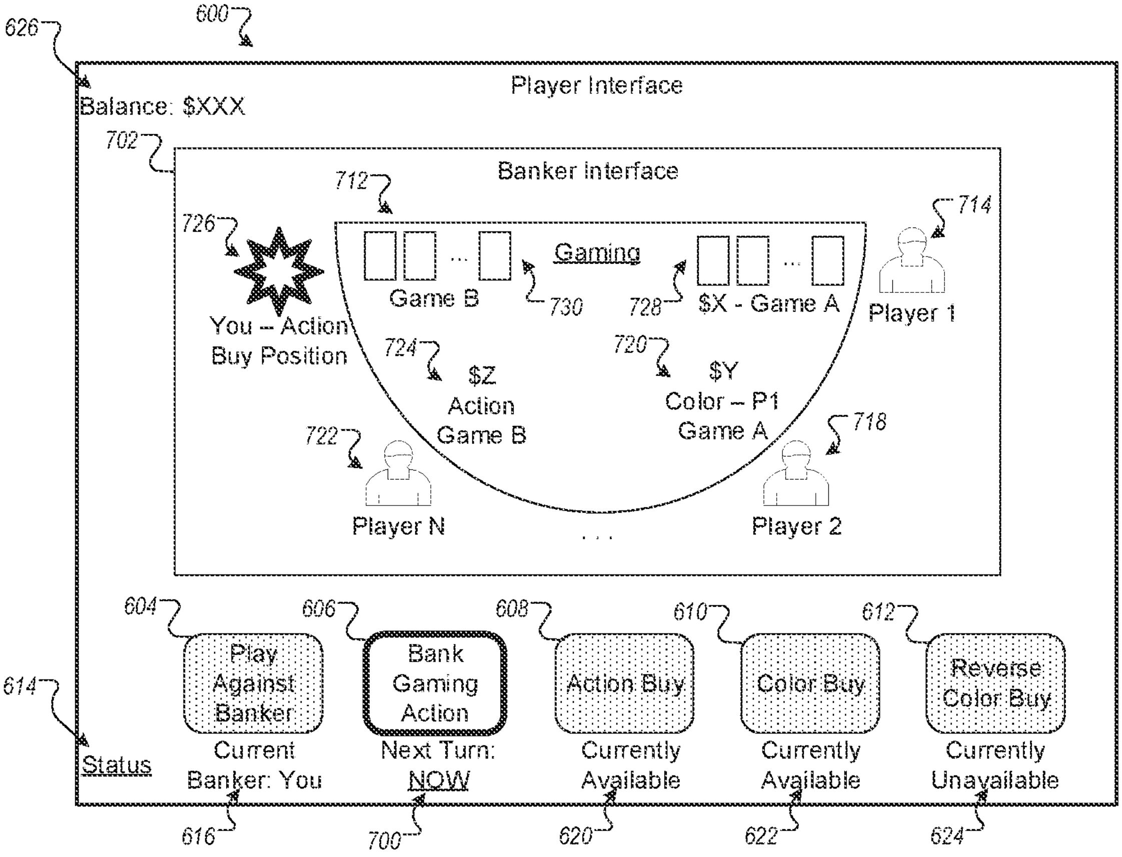

Referring to FIG. 7D, gaming action for the wagers described in FIG. 70 is depicted. In this example, the gaming action being provided to player 1 (714) is depicted through the graphical elements 728, which can include any of a variety of graphical elements, such as cards, dice, positions (e.g., routlette positions), and/or others. The graphical elements 728 can permit the player (acting as the banker) to monitor the current status of player 1's action, but may not permit the player to act in any way or to otherwise influence the gaming outcome for player 1. Similarly, graphical elements 730 for the action buy gaming being provided by the player (acting as the banker) is presented in the interface. In this example, though, the player can directly make the gaming decisions (e.g., hold, hit, stay, double), can select one or more predetermined strategies for the gaming action that cause automated gaming decisions to be made according to the strategies, and/or other appropriate techniques.

Figure 7E:
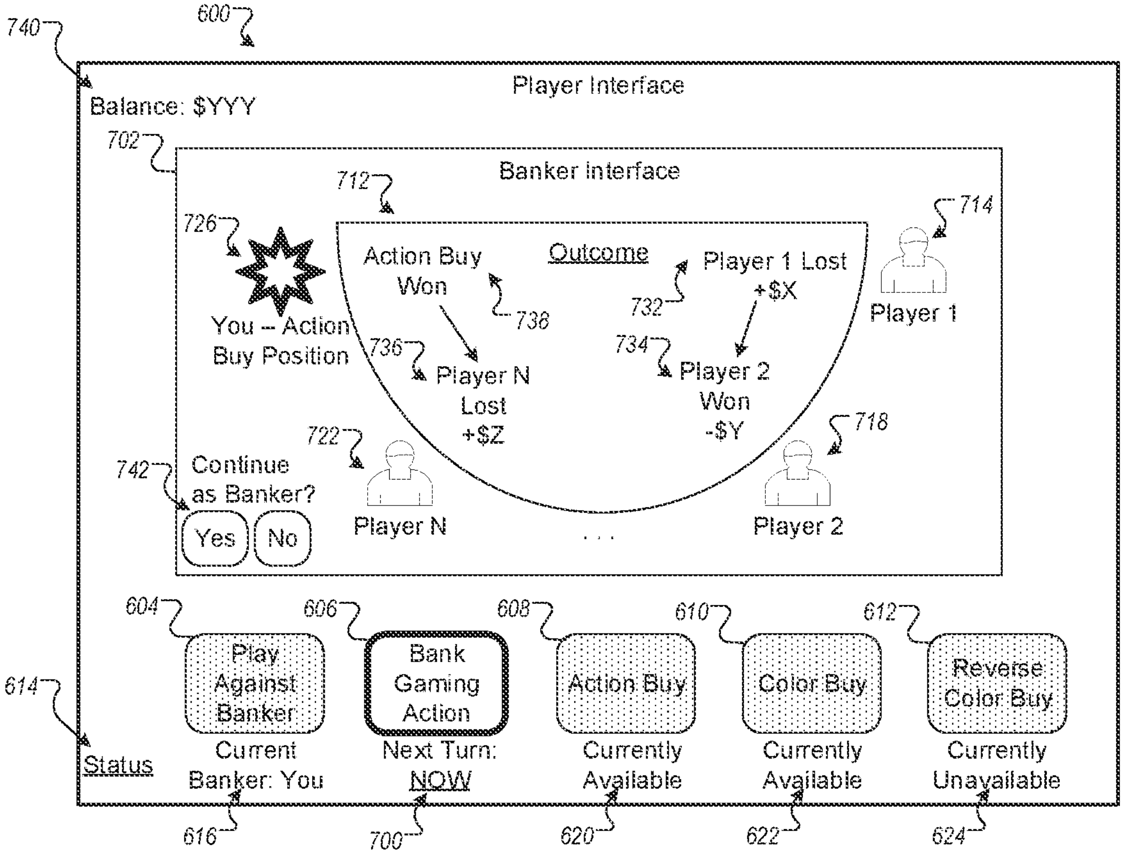

Referring to FIG. 7E, the outcomes of the action on the table 712 which the player is backing are presented. In this example, the player 1 (714) lost his/her hand/position (732), meaning that the player (acting at the banker) won the $X wager placed by player 1 (as indicated by the "+$X"). Since player 2 (718) had a color buy on the outcome of player 1's wager, player 2 ended up winning (734)—meaning that the player (acting as the banker) backed the $Y wager placed by player 2 and (assuming 1:1 odds for the wager) paid out/lost $Y to player 2 (as indicated by "−$Y"). In the action buy position, the player/banker ended up winning (738), meaning that the action buy by player N (722) failed and so the player/banker received the $Z wager placed by player N for the action buy (as indicated by the "+$Z") (736). The gaming balance 740 for the player (acting as the banker) is adjusted according to the outcomes of the gaming action the player was backing as the banker. The player is then given the option (742) to continue acting as the banker, or to relinquish the role and permit it to fall to the next player in line. If the player elects to continue as the banker, the steps that are described throughout FIGS. 7A-E can be repeated (although the settings interface presented in FIG. 7B may only be presented if selected by the player after the first hand/gaming action—it can be presumed that those settings carry over from hand to hand unless identified to the contrary by the player).

Figure 8A:
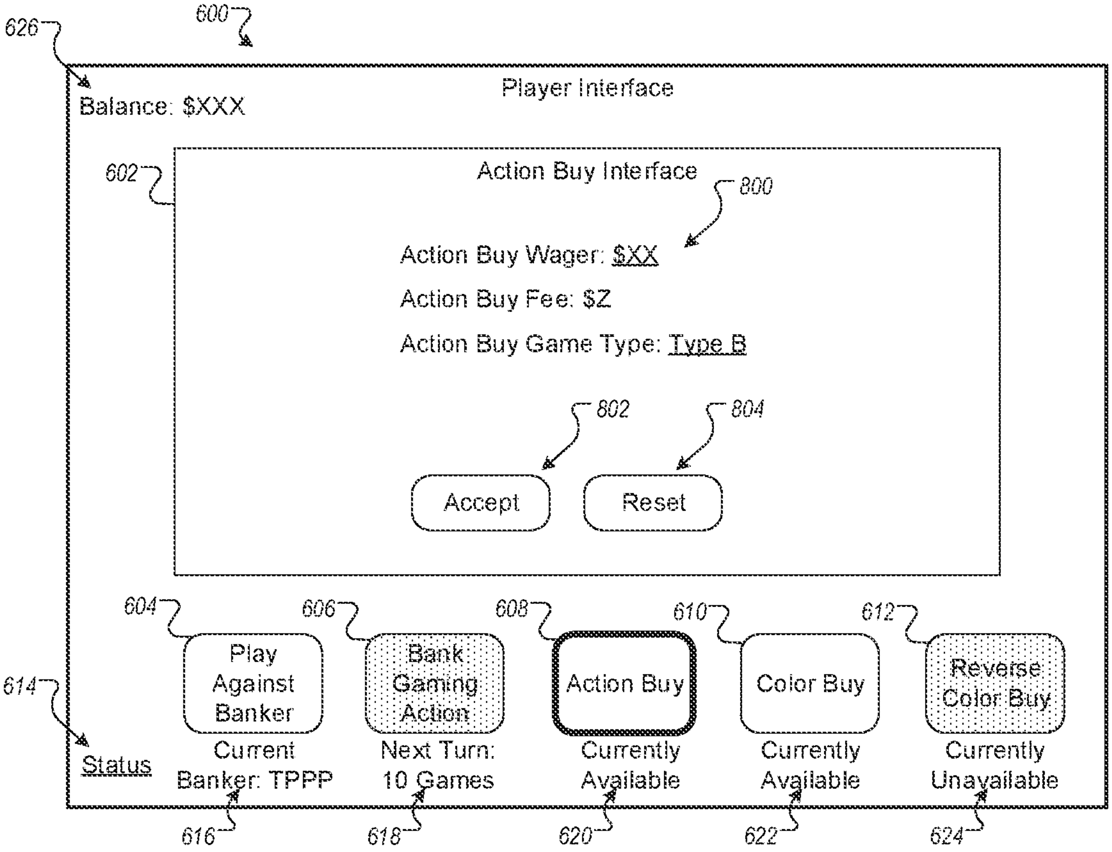

Referring to FIG. 8A, an action buy interface is presented in response to the player selecting the action buy button 608. In the action buy interface, the player is given input fields through which the player can designate the wager amount the player is willing to back for the action buy and, in some instances, the type of game that the player is buying action on (800). The action buy fee may be preset by the banker and may not be alterable by the player. Once set, the player can accept the parameters for the action buy (802), and/or can reset the values that are presented (804). Once accepted, the action buy wager by the player can be transmitted from the player's gaming equipment to the computer and/or computer system (126, 128) managing the TPPP gaming to enter the action buy for the next hand/action.

Figure 8B:
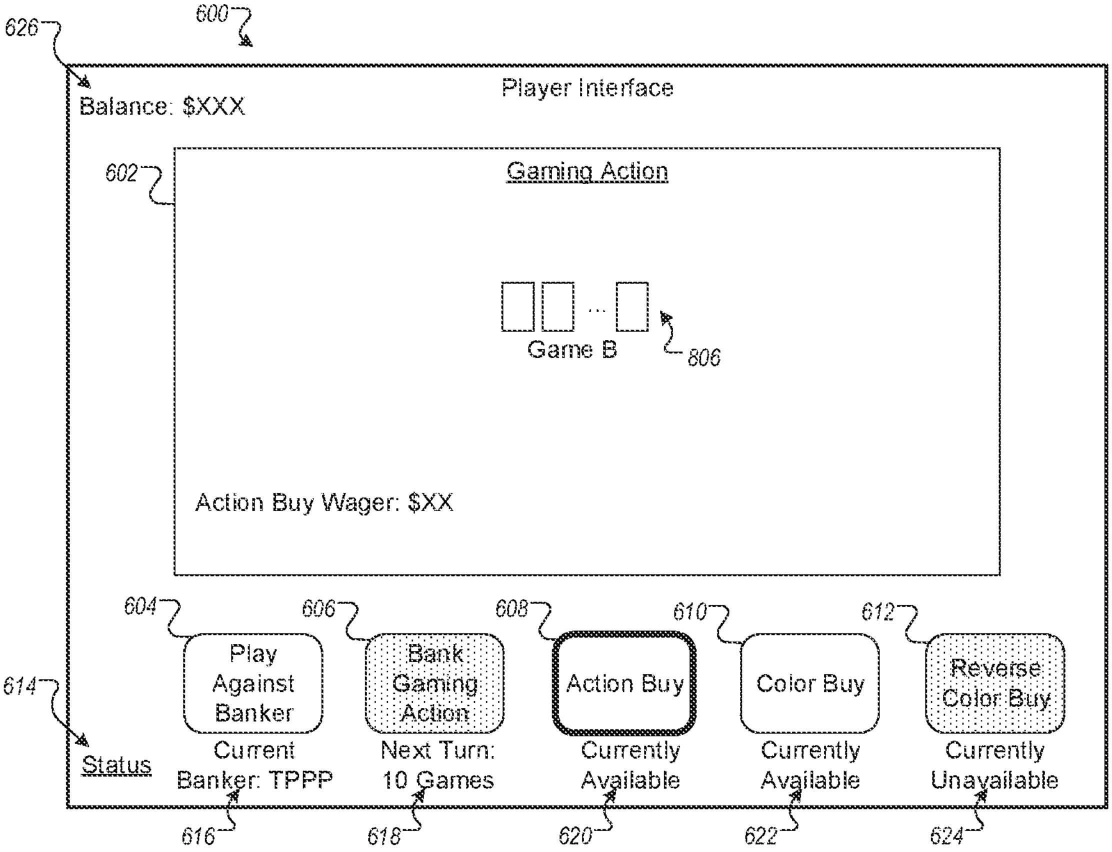

Referring to FIG. 8B, the gaming action for the action buy wager is presented to the player. Since the player has effectively taken on the roll of the banker for this action, the player may have little or no control over the outcome of the game, and may instead be able to simply monitor the outcome of the gaming action (806). In instances where the house employs one or more variable gaming strategies for the game that is being presented for the action buy, the player may be provided with one or more interface controls through which the player can designate (either directly or indirectly) those strategies in the interface 602.

Figure 8C:
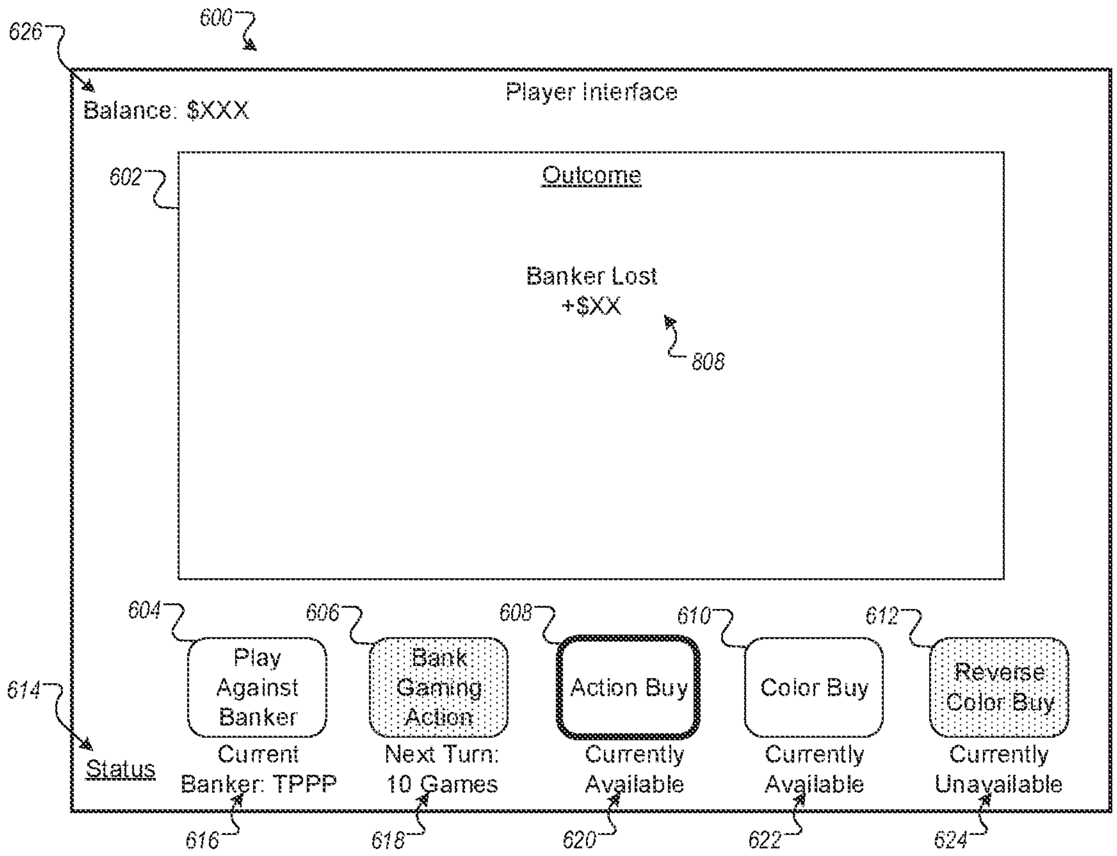

Referring to FIG. 8C, the outcome of the action buy is presented (808). The outcome includes information identifying whether the banker, who was providing the action for the action buy, won or lost, as well as information identifying the impact of that gaming outcome on the player's balance. In this example, the banker lost the action, resulting in the player netting $XX (as indicated by "+$XX").

Figure 9:
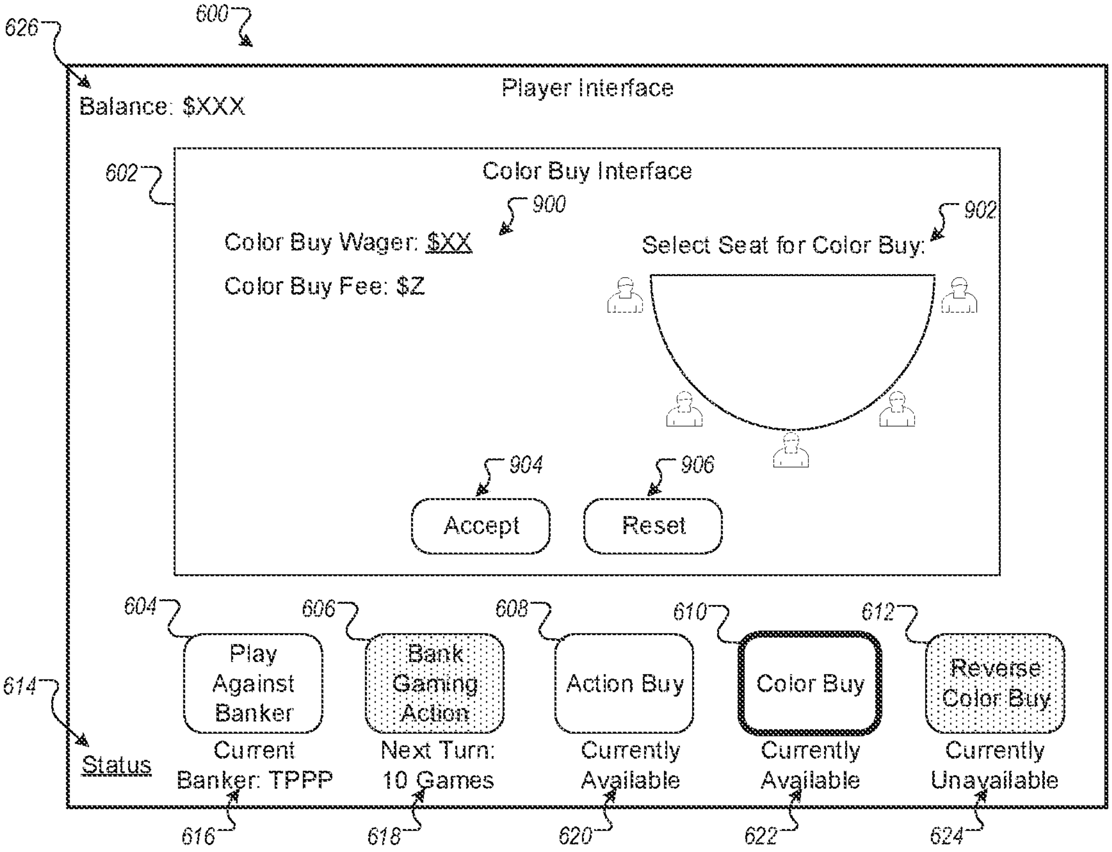

Referring to FIG. 9, an example color buy interface is presented in response to the player selecting the color buy option 610. In this interface, the player is given selectable options to designate a wager amount and to view the color buy fee (900), and is also given the option to select a seat/position at the table for the color buy (902). Once the player has designated the wager amount for the color buy (e.g., maximum amount the player is willing to back), the player can accept the settings to proceed with the color buy (904) and/or can reset the selections (906). Once a color buy is designated, the interface can present similar features as those shown for the action buy (e.g., FIGS. 8B-C).

Figure 10:
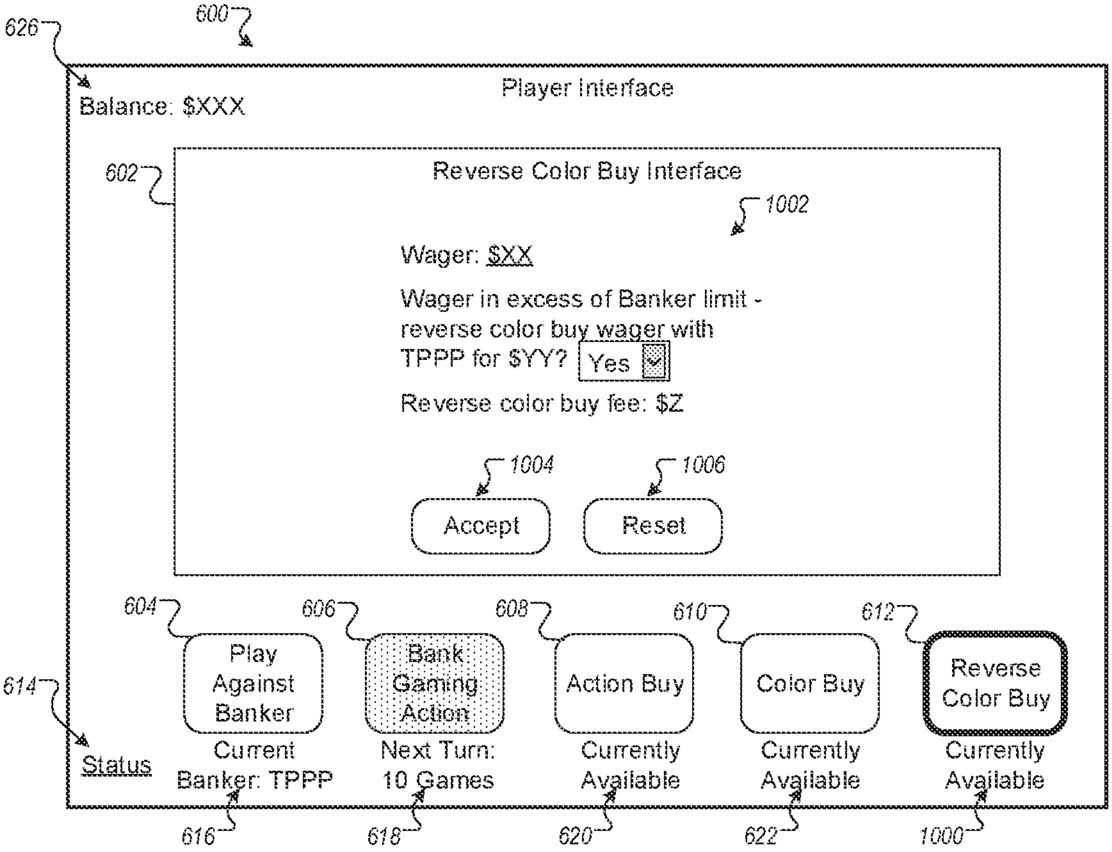

Referring to FIG. 10, an example interface for reverse color buys is presented. In this example, the reverse color buy option is now available, as indicated by updated status 1000. In the interface, the player is provided with options to designate a total wager amount ($XX), a selectable option for agreeing to wager a portion of the total wager amount that is excess of the maximum backed amount by the current banker ($YY), and is shown the current reverse color buy fee, which may not be designated by the player. If this is acceptable to the player, the player can proceed with accepting the reverse color buy (1004), or can reset the settings (1006). The reverse color buy can proceed in a similar manner to standard/traditional gaming action in which the player is provided with a hand/action, can perform one or more actions (e.g., hold, hit, double), and then has an outcome determined for the game, similar to what is described above with regard to FIG. 6.

FIGS. 11-14 are example GUIs that can be presented on TPPP gaming devices to manage and provide TPPP-related gaming features. The example GUIs that are depicted in FIGS. 11-14 can be provided on any of a variety of appropriate player gaming equipment, such as TPPP devices 125, and/or other appropriate devices. The GUIs that are depicted in these figures can be presented on any of a variety of display devices, such as touchscreen displays, mobile displays, wearable displays, stationary displays, and/or others. Any of a variety of corresponding user input devices can be associated with the interfaces to receive user input, such as physical buttons and/or keys, touchscreen features (e.g., virtual buttons, selectable icons), motion and/or gesture-based features (e.g., accelerometers, cameras), voice-based features (e.g., microphones), and/or combinations thereof.

Figure 11:
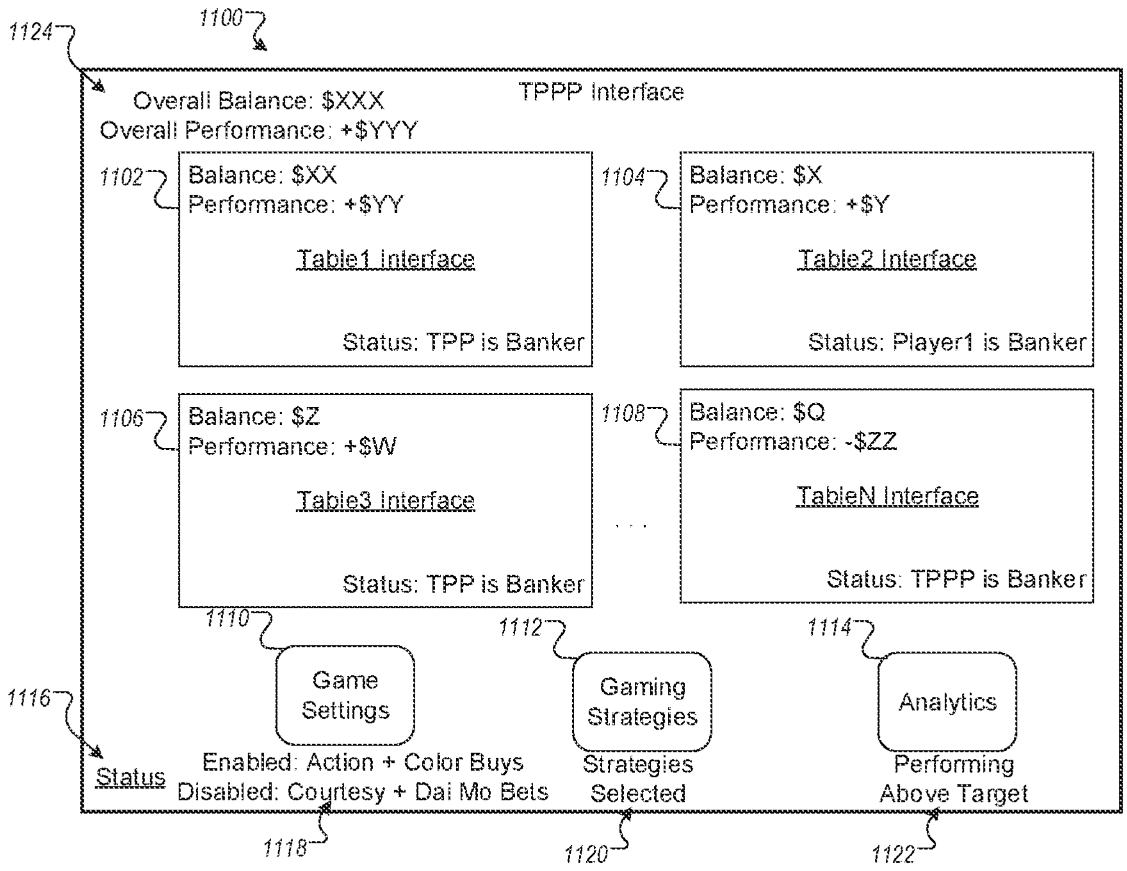
FIGS. 11-14 are example graphical user interfaces (GUIs) that can be presented on TPPP gaming devices to provide TPPP-related gaming features.

Referring to FIG. 11, an example TPPP interface 1100 is depicted through which a TPPP can monitor and manage gaming action across multiple different tables. A table can include not only a physical gaming table around which a group of players are seated, but can also include a physical dealer station that is providing gaming action to players who are remote from the dealer station (e.g., seated at a gaming device that is within the same facility, but not physically connected to the dealer station). For example, a "table" can be considered to include remote players using devices 136-138 and players at other gaming stations 130-132 who are receiving gaming action from the dealer 124 via the scanner 122 and table computer 126.

In the depicted example, the interface 1100 simultaneously displays status information for multiple different tables in, for example, different segments 1102-1108 of the display. For example, segment 1102 can present status information for the table 102, segment 1104 can present status information for the table 130, segment 1106 can present status information for the table 132, and segment 1108 can present status information for another table not depicted in the example in FIG. 1. Again, the "table" can correspond to the players who are receiving action from a dealer, regardless of whether the players are physically at the dealer's station or remote from the station (e.g., physically separated from dealer station but within same facility, remote from facility). Each of these segments 1102-1108 can present any of a variety of information for each of the corresponding gaming tables, such as providing current TPPP balance information for the table (e.g., funds initially allocated to back action on the table with adjustments based on action on the table), the performance for the table (e.g., net increase or decrease in the balance), a current banker status (e.g., TPPP is the banker, identification of other player serving as banker), current action on the tables (e.g., view of the current hands for each player, gaming decisions by each player, dealer cards, amount currently being backed by the banker for the current hand), player information (e.g., average bet amount, performance during gaming sessions, player identification), and/or other relevant information. The status information in each of the segments 1102-1108 can be presented using text as well as graphical elements, such as those presented in FIGS. 7C-E showing a gaming table, players, gaming action, and gaming outcomes. FIG. 11 shows example status information in each of the segments 1102-1108.

The interface 1100 also includes selectable buttons 1110-1114 through which the TPPP user can designate game settings (1110), gaming strategies (1112), and view more detailed analytics (1114). The interface 1110 includes current status information 1116 for each of these options, including providing a brief summary of the current game settings (1118), whether any non-default gaming strategies have been selected (1120), and the overall performance of the TPPP session (1122).

The interface further includes overall balance and performance information 1124 that aggregates the balances and performance across all of the tables that are being managed via the TPPP interface 1100. The interface 1100 permits a single TPPP user to monitor, manage, and provide TPPP services across multiple different tables at a gaming facility. With conventional gaming technology, which involved a TPPP being assigned to an individual table, multiple TPPP users would have been required to manage the multiple different tables that are represented in the segments 1102-1108. By using the technological features included in the systems, devices, and techniques described throughout this document, a single TPPP user is able to manage, monitor, and track multiple different gaming tables simultaneously. This can provide any of a variety of advantages over conventional gaming systems, including creating greater efficiencies, minimizing labor requirements, creating greater accuracy both in terms of gaming outcomes and management, providing faster and more responsive TPPP services, and/or other advantages.

Figure 12:
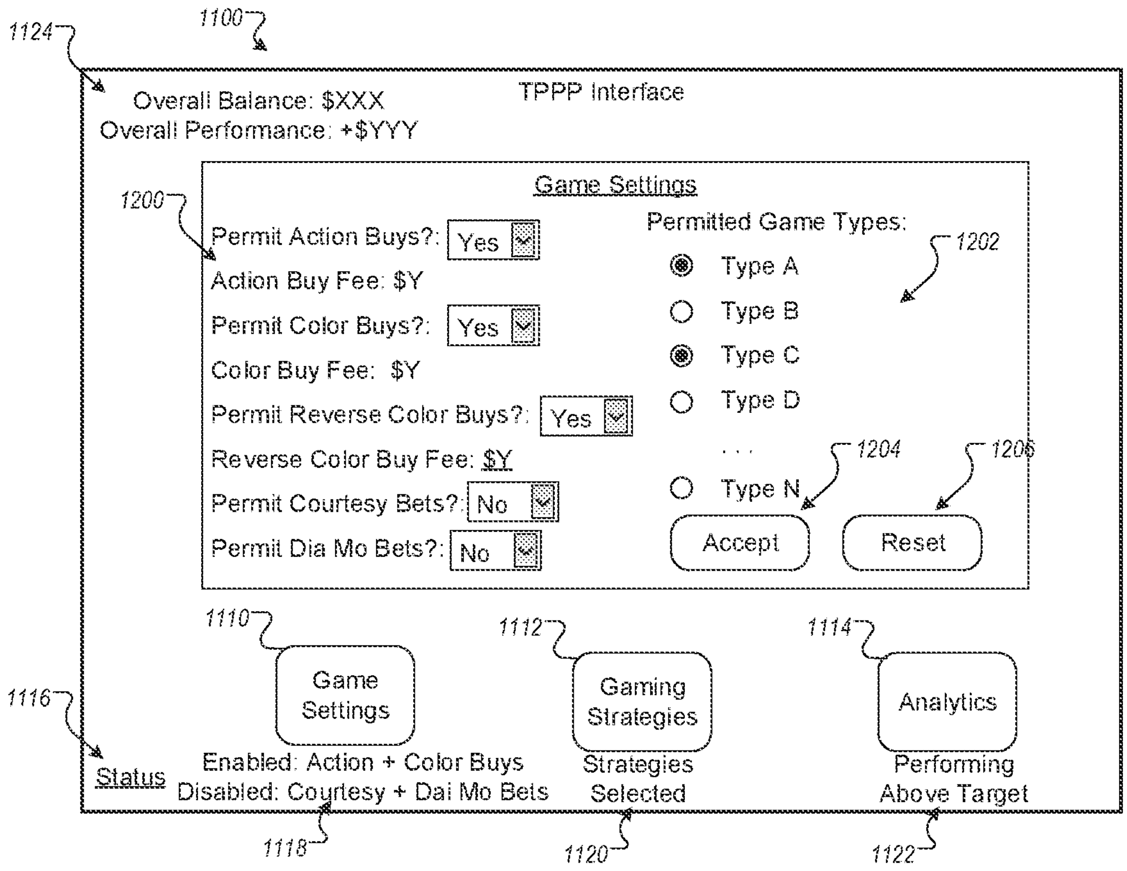

Referring to FIG. 12, an example interface through which a TPPP user can designate game settings. The TPPP user can designate any of a variety of settings 1200, such as designating whether to permit action buys, setting the action buy fee, designating whether to permit color buys, setting the color buy fee, designating whether to permit reverse color buys, designating the color buy fee, designating whether to permit courtesy bets, designating whether to permit dia mo bet, and/or other settings. The TPPP user can also designate which games types are permitted to be played (1202). As discussed above, a single deal of cards at the tables can be used to provide multiple different games across player devices simultaneously. A TPPP user can designate which of multiple different games, including non-card games that can be determined from cards being dealt (e.g., roulette, slots), the TPPP is willing to back for a gaming session. The TPPP user can accept the settings 1204, which can then be used to provide gaming action on the tables and player devices, or the TPPP can reset the settings 1206.

Figure 13:
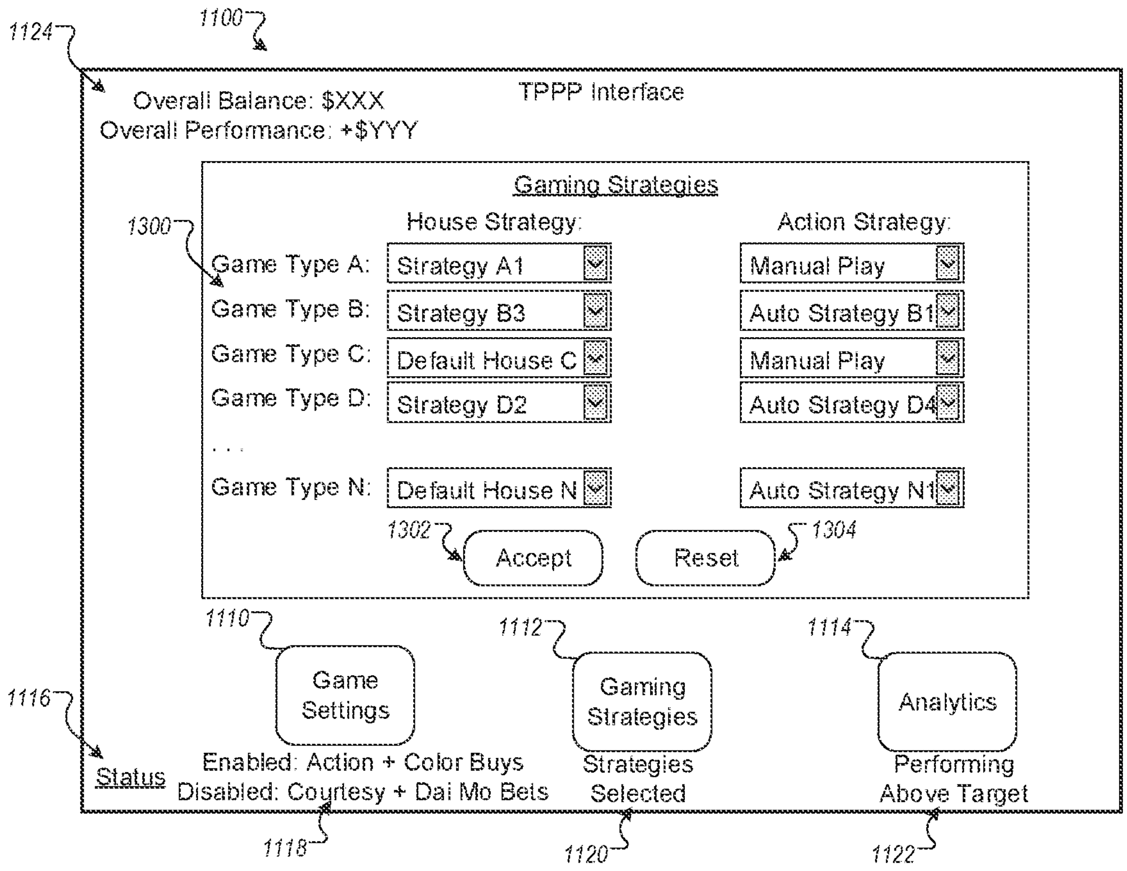

Referring to FIG. 13, the interface an include selectable options 1300 for a TPPP to designate gaming strategies that are used to provide the gaming outcomes. For example, the TPPP user can designate different strategies, including default strategies, that are to be used by the house to provide gaming outcomes. These strategies can include, for example, variable house rules that are to be followed for a particular game, such as whether to hit on a soft 17 in blackjack. Default strategies and non-default strategies can be selected for each game type, where applicable. The options 1300 can also include action strategies for the TPPP, including automated strategies (both default and customized strategies) that will cause the TPPP's play to be automatically performed according to the selected strategy, and manual action play for which the TPPP will be prompted with an interface through which the TPPP can directly make the action gaming decisions. An example of such an interface for the TPPP is presented in FIG. 14. Once set, the options 1300 can be accepted 1302 and used to provide gaming outcomes, or they can be reset 1304 to default values.

Figure 14:
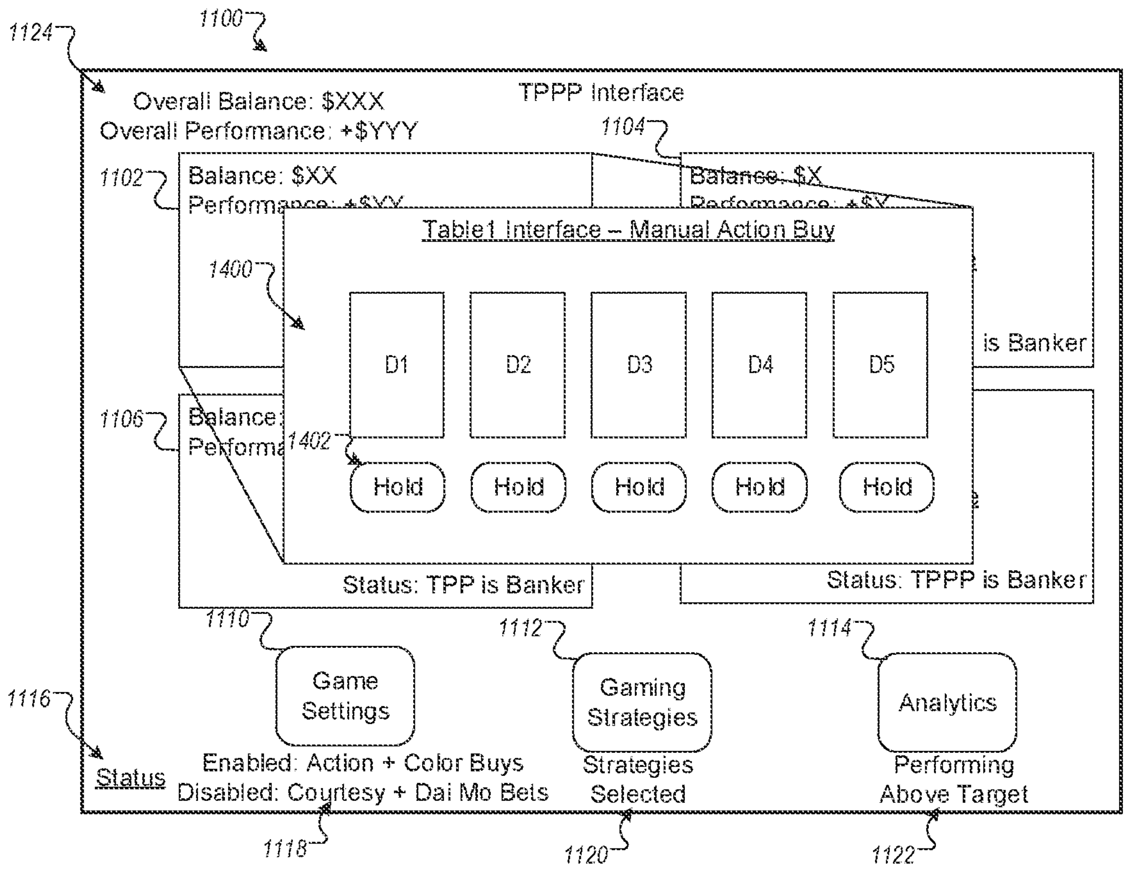

Referring to FIG. 14, an example interface 1400 is presented through which the TPPP user can make gaming decisions in response to a player at table 1 performing an action buy. In this example, the TPPP has previously designated manual play for action buys on that game and/or table. The TPPP is presented with selectable options 1402 to make gaming decisions, which in this example is whether to hold cards that have been dealt to the TPPP. Other interfaces are also possible, including interfaces for different types of games. The interface 1400 can automatically be presented on the interface 1200 in response to manual action from the TPPP being required on any of the tables. Multiple interfaces 1400 can be presented simultaneously in the interface 1200 when manual action is contemporaneously requested from the TPPP on multiple different tables-permitting the TPPP to manage multiple different tables simultaneously.

Figure 15:
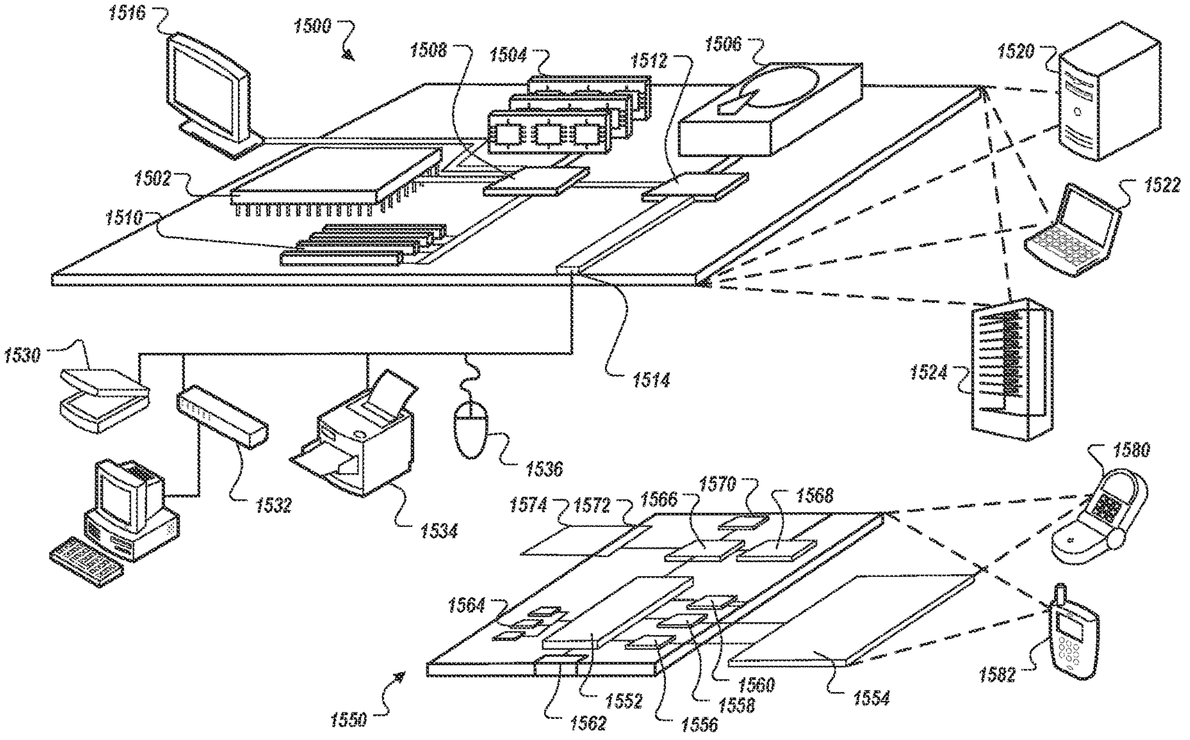
FIG. 15 shows an example of a computing device and a mobile computing device that can be used to implement the techniques described here.

FIG. 15 shows an example of a computing device 1500 and a mobile computing device 1550 that can be used to implement the techniques described here. The computing device 1500 is intended to represent various forms of digital computers, such as laptops, desktops, workstations, personal digital assistants, servers, blade servers, mainframes, and other appropriate computers. The mobile computing device 1550 is intended to represent various forms of mobile devices, such as personal digital assistants, cellular telephones, smart-phones, and other similar computing devices. Additionally, computing device 1500 or 1550 can include Universal Serial Bus (USB) flash drives. The USB flash drives may store operating systems and other applications.

The USB flash drives can include input/output components, such as a wireless transmitter or USB connector that may be inserted into a USB port of another computing device. The components shown here, their connections and relationships, and their functions, are meant to be examples only, and are not meant to be limiting.

The computing device 1500 includes a processor 1502, a memory 1504, a storage device 1506, a high-speed interface 1508 connecting to the memory 1504 and multiple high-speed expansion ports 1510, and a low-speed interface 1512 connecting to a low-speed expansion port 1514 and the storage device 1506. Each of the processor 1502, the memory 1504, the storage device 1506, the high-speed interface 1508, the high-speed expansion ports 1510, and the low-speed interface 1512, are interconnected using various busses, and may be mounted on a common motherboard or in other manners as appropriate. The processor 1502 can process instructions for execution within the computing device 1500, including instructions stored in the memory 1504 or on the storage device 1506 to display graphical information for a GUI on an external input/output device, such as a display 1516 coupled to the high-speed interface 1508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 1504 stores information within the computing device 1500. In some implementations, the memory 1504 is a volatile memory unit or units. In some implementations, the memory 1504 is a non-volatile memory unit or units. The memory 1504 may also be another form of computer-readable medium, such as a magnetic or optical disk.

The storage device 1506 is capable of providing mass storage for the computing device 1500. In some implementations, the storage device 1506 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 1502), perform one or more methods, such as those described above. The instructions can also be stored by one or more storage devices such as computer- or machine-readable mediums (for example, the memory 1504, the storage device 1506, or memory on the processor 1502).

The high-speed interface 1508 manages bandwidth-intensive operations for the computing device 1500, while the low-speed interface 1512 manages lower bandwidth-intensive operations. Such allocation of functions is an example only. In some implementations, the high-speed interface 1508 is coupled to the memory 1504, the display 1516 (e.g., through a graphics processor or accelerator), and to the high-speed expansion ports 1510, which may accept various expansion cards. In the implementation, the low-speed interface 1512 is coupled to the storage device 1506 and the low-speed expansion port 1514. The low-speed expansion port 1514, which may include various communication ports (e.g., USB, Bluetooth, Ethernet, wireless Ethernet) may be coupled to one or more input/output devices. Such input/output devices may include a scanner 1530, a printing device 1534, or a keyboard or mouse 1536. The input/output devices may also by coupled to the low-speed expansion port 1514 through a network adapter. Such network input/output devices may include, for example, a switch or router 1532.

The computing device 1500 may be implemented in a number of different forms, as shown in the FIG. 15. For example, it may be implemented as a standard server 1520, or multiple times in a group of such servers. In addition, it may be implemented in a personal computer such as a laptop computer 1522. It may also be implemented as part of a rack server system 1524. Alternatively, components from the computing device 1500 may be combined with other components in a mobile device, such as a mobile computing device 1550. Each of such devices may contain one or more of the computing device 1500 and the mobile computing device 1550, and an entire system may be made up of multiple computing devices communicating with each other.

The mobile computing device 1550 includes a processor 1552, a memory 1564, an input/output device such as a display 1554, a communication interface 1566, and a transceiver 1568, among other components. The mobile computing device 1550 may also be provided with a storage device, such as a micro-drive or other device, to provide additional storage. Each of the processor 1552, the memory 1564, the display 1554, the communication interface 1566, and the transceiver 1568, are interconnected using various buses, and several of the components may be mounted on a common motherboard or in other manners as appropriate.

The processor 1552 can execute instructions within the mobile computing device 1550, including instructions stored in the memory 1564. The processor 1552 may be implemented as a chipset of chips that include separate and multiple analog and digital processors. For example, the processor 1552 may be a Complex Instruction Set Computers (CISC) processor, a Reduced Instruction Set Computer (RISC) processor, or a Minimal Instruction Set Computer (MISC) processor. The processor 1552 may provide, for example, for coordination of the other components of the mobile computing device 1550, such as control of user interfaces, applications run by the mobile computing device 1550, and wireless communication by the mobile computing device 1550.

The processor 1552 may communicate with a user through a control interface 1558 and a display interface 1556 coupled to the display 1554. The display 1554 may be, for example, a Thin-Film-Transistor Liquid Crystal Display (TFT) display or an Organic Light Emitting Diode (OLED) display, or other appropriate display technology. The display interface 1556 may comprise appropriate circuitry for driving the display 1554 to present graphical and other information to a user. The control interface 1558 may receive commands from a user and convert them for submission to the processor 1552. In addition, an external interface 1562 may provide communication with the processor 1552, so as to enable near area communication of the mobile computing device 1550 with other devices. The external interface 1562 may provide, for example, for wired communication in some implementations, or for wireless communication in other implementations, and multiple interfaces may also be used.

The memory 1564 stores information within the mobile computing device 1550. The memory 1564 can be implemented as one or more of a computer-readable medium or media, a volatile memory unit or units, or a non-volatile memory unit or units. An expansion memory 1574 may also be provided and connected to the mobile computing device 1550 through an expansion interface 1572, which may include, for example, a Single in Line Memory Module (SIMM) card interface. The expansion memory 1574 may provide extra storage space for the mobile computing device 1550, or may also store applications or other information for the mobile computing device 1550. Specifically, the expansion memory 1574 may include instructions to carry out or supplement the processes described above, and may include secure information also. Thus, for example, the expansion memory 1574 may be provided as a security module for the mobile computing device 1550, and may be programmed with instructions that permit secure use of the mobile computing device 1550. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. that the instructions, when executed by one or more processing devices (for example, processor 1552), perform one or more methods, such as those described above. The instructions can also be stored by one or more storage devices, such as one or more computer- or machine-readable mediums (for example, the memory 1564, the expansion memory 1574, or memory on the processor 1552). In some implementations, the instructions can be received in a propagated signal, for example, over the transceiver 1568 or the external interface 1562.

The mobile computing device 1550 may communicate wirelessly through the communication interface 1566, which may include digital signal processing circuitry where necessary. The communication interface 1566 may provide for communications under various modes or protocols, such as Global System for Mobile communications (GSM) voice calls, Short Message Service (SMS), Enhanced Messaging Service (EMS), or Multimedia Messaging Service (MMS) messaging, code division multiple access (CDMA), time division multiple access (TDMA), Personal Digital Cellular (PDC), Wideband Code Division Multiple Access (WCDMA), CDMA2000, or General Packet Radio Service (GPRS), among others. Such communication may occur, for example, through the transceiver 1568 using a radio-frequency. In addition, short-range communication may occur, such as using a Bluetooth, Wi-Fi, or other such transceiver. In addition, a Global Positioning System (GPS) receiver module 1570 may provide additional navigation- and location-related wireless data to the mobile computing device 1550, which may be used as appropriate by applications running on the mobile computing device 1550.

The mobile computing device 1550 may also communicate audibly using an audio codec 1560, which may receive spoken information from a user and convert it to usable digital information. The audio codec 1560 may likewise generate audible sound for a user, such as through a speaker, e.g., in a handset of the mobile computing device 1550. Such sound may include sound from voice telephone calls, may include recorded sound (e.g., voice messages, music files, etc.) and may also include sound generated by applications operating on the mobile computing device 1550.

The mobile computing device 1550 may be implemented in a number of different forms, as shown in the figure. For example, it may be implemented as a cellular telephone 1580. It may also be implemented as part of a smart-phone, personal digital assistant, or other similar mobile device.

Various implementations of the systems and techniques described here can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a cathode ray tube (CRT) or liquid crystal display (LCD) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. An electronic gaming system comprising:

one or more physical gaming pieces that are used to determine gaming outcomes;

a scanner that is configured to identify each of the one or more physical gaming pieces that are physically manipulated by a dealer or a player;

a plurality of player computing equipment with graphical displays that are programmed to provide gaming interfaces for a plurality of players, the gaming interfaces each being programmed to provide electronic gaming actions for one or more games being played by the plurality of players based, at least in part, on the identified one or more physical gaming pieces, a plurality of third-party provider of proposition player (TPPP) computing equipment, each of the TPPP computing equipment comprising (i) a display to present a graphical user interface (GUI) that is programmed to provide a gaming management interface outputting selectable options through which a TPPP (a) designates gaming settings for the one or more games being played by the plurality of players at the plurality of player computing equipment and (b) manages backing of electronic gaming actions provided across the plurality of player computing equipment and (ii) a network interface through which the TPPP computing equipment transmits the gaming settings for the one or more games, wherein each of the plurality of TPPP computing equipment is configured to automatically switch between at least (i) a first mode of operation in which gaming action is provided to a user of the TPPP computing equipment and (ii) a second mode of operation in which gaming action across at least a portion of the other TPPP computing equipment is covered by the user, wherein each of the plurality of TPPP computing equipment is further programmed to display a gaming interface for the TPPP computing equipment based, at least in part, on a current mode of operation for the TPPP computing equipment; and a gaming computer system that is communicably connected to (i) the scanner, (ii) the plurality of player computing equipment, (iii) the plurality of TPPP computing equipment, (iv) player accounts, and (v) TPPP accounts, the gaming computer system being programmed to, for the one or more games being played by the plurality of players at the plurality of player computing equipment:

assign at least one of the plurality of TPPP computing equipment to cover the gaming actions for the one or more games, wherein the assigning comprises assigning the plurality of TPPP computing equipment to take turns in covering the gaming actions for the one or more games based on one or more assignment criteria corresponding to gameplay time, coverage amounts, or bid amounts;

receive, from the assigned at least one TPPP computing equipment, data indicative of the gaming settings for the one or more games;

obtain player input data for the one or more games from at least a portion of the plurality of player computing equipment according to the gaming settings;

automatically determine gaming outcomes for each player corresponding to at least the portion of the plurality of player computing equipment based, at least in part, on the identified one or more physical gaming pieces, the player input, and the gaming settings;

automatically reconcile a player account for each player corresponding to at least the portion of the plurality of player computing equipment and the TPPP account associated with the assigned at least one TPPP computing equipment based on the determined gaming outcomes; and based on reconciling the player account for each player and the TPPP account, (i) present a loss of a wager amount on the display of the assigned at least one TPPP computing equipment and (ii) present a win of the wager amount on the graphical display of the player computing equipment corresponding to the player.

2. The electronic gaming system of claim 1, wherein the gaming computer system is further programmed to:

receive data from a first player computing equipment of the plurality of player computing equipment indicating player-selection of an option to become a TPPP and assign the first player computing equipment as one of the plurality of TPPP computing equipment to cover gaming action on the one or more games.

3. The electronic gaming system of claim 2, wherein the gaming computer system is further configured to activate, during the second mode of operation in the GUI at the display of the at least one TPPP computing equipment, one or more of the selectable options to:

designate the gaming settings, pay out one or more of the players of the one or more games, perform one or more gaming decisions, select automated rules to use for the one or more games, modify the automated rules or the gaming settings for the one or more games, and create one or more new gaming rules for the one or more games.

4. The electronic gaming system of claim 2, wherein when the at least one TPPP computing equipment switches from the first mode to the second mode, the gaming computer system is further configured to deactivate, in the GUI at the display of the at least one TPPP computing equipment, one or more of the selectable options to:

play against the at least one TPPP computing equipment, perform an action buy, perform a color buy, and perform a reverse color buy.

5. The electronic gaming system of claim 1, wherein the display on the TPPP computing equipment presents, in the GUI, in the second mode, and for the one or more games, a current TPPP balance, a game performance, a current banker status, current actions, and player information.

6. The electronic gaming system of claim 5, wherein the display on the TPPP computing equipment further presents, in the second mode and in the GUI, an aggregated balance and an aggregated performance for all games to which the at least one TPPP computing equipment is assigned.

7. The electronic gaming system of claim 1, wherein the display on the TPPP computing equipment presents, in the first mode and in the GUI in response to receiving, from a player computing equipment of a player who is playing the one or more games, player-selection of a graphical element for an action buy option in the one or more games, a gaming interface for the one or more games through which the at least one TPPP computing equipment selects at least one graphical element to perform actions in playing the one or more games as provided via the gaming computer system.

8. The electronic gaming system of claim 7, wherein:

the network interface for the at least one TPPP computing equipment transmits, to the gaming computer system, data representative of electronic gaming actions performed by the at least one TPPP computing equipment according to TPPP input indicating selection of the at least one graphical element that is received from the at least one TPPP computing equipment, and the gaming computer system determines the gaming outcomes for each player further based on the electronic gaming actions performed by the at least one TPPP computing equipment according to the TPPP input.

9. The electronic gaming system of claim 1, wherein the win of the wager amount is presented as a graphical element in a gaming interface for the one or more games being played by the player.

10. The electronic gaming system of claim 1, wherein reconciling the player account comprises, when the at least one TPPP computing equipment loses the game in an action buy, adding, by the gaming computer system, the wager amount to the player account and deducting, by the gaming computer system, the wager amount from the TPPP account.

11. The electronic gaming system of claim 1, wherein the graphical displays of the plurality of player computing equipment are configured to present the same GUI that is presented at the display of the plurality of TPPP computing equipment, wherein a first portion of the selectable options are activated for user selection at the plurality of player computing equipment and the first portion of the selectable options are deactivated for user selection at the plurality of TPPP computing equipment.

12. The electronic gaming system of claim 11, wherein the obtained player input data comprises selection of at least one of the selectable options amongst the first portion of the selectable options.

13. The electronic gaming system of claim 11, wherein a second portion of the selectable options are deactivated for user selection at the plurality of player computing equipment and the second portion of the selectable options are activated for user selection at the plurality of TPPP computing equipment.

14. The electronic gaming system of claim 13, wherein the received data indicative of the gaming settings comprises selection of at least one of the selectable options amongst the second portion of the selectable options.

15. The electronic gaming system of claim 1, wherein the plurality of player computing equipment comprises at least one of the plurality of TPPP computing equipment.

16. The electronic gaming system of claim 1, wherein at least one of the plurality of player computing equipment is remote from the scanner.

17. The electronic gaming system of claim 1, wherein:

at least one of the plurality of player computing equipment comprises a network interface configured to provide network communication with the gaming computer system via Internet, a local area network (LAN), a wide area network (WAN), a virtual private network (VPN), a mobile data network, WiFi, or BLUETOOTH, and the gaming computer system is remote from the at least one of the plurality of player computing equipment.

18. The electronic gaming system of claim 17, wherein the at least one of the plurality of player computing equipment is further configured to:

receive, from the gaming computer system, code to provide the gaming interfaces and the electronic gaming actions for the one or more games; and execute the code to provide the gaming interfaces and the electronic gaming actions.

19. The electronic gaming system of claim 18, wherein the code comprises at least one of:

a mobile application, a browser application that runs within a browser application at the at least one of the plurality of player computing equipment, and an application that is downloaded and installed directly at the at least one of the plurality of player computing equipment.

20. The electronic gaming system of claim 1, wherein the gaming computer system is configured to transmit, to at least one of the plurality of player computing equipment, a communication feed to provide real-time interaction between a set of players proximate the scanner and a set of players remote from the scanner.

* * * * *